(12) United States Patent
Ito et al.

(10) Patent No.: US 8,512,847 B2
(45) Date of Patent: Aug. 20, 2013

(54) TRANSPARENT CONDUCTIVE LAMINATE AND TOUCH PANEL

(75) Inventors: Haruhiko Ito, Hino (JP); Koichi Ueda, Neyagawa (JP); Kazuhito Kobayashi, Hirakata (JP); Hidefumi Kusuda, Hirakata (JP)

(73) Assignee: Teijin Limited, Osaka (JP)

( * ) Notice: Subject to any disclaimer, the term of this patent is extended or adjusted under 35 U.S.C. 154(b) by 586 days.

(21) Appl. No.: 12/739,673

(22) PCT Filed: Sep. 19, 2008

(86) PCT No.: PCT/JP2008/067590
§ 371 (c)(1), (2), (4) Date: Jul. 20, 2010

(87) PCT Pub. No.: WO2009/054227
PCT Pub. Date: Apr. 30, 2009

(65) Prior Publication Data
US 2010/0289762 A1 Nov. 18, 2010

(30) Foreign Application Priority Data

Oct. 26, 2007 (JP) .................................. 2007-278495
Sep. 11, 2008 (JP) .................................. 2008-233357

(51) Int. Cl.
*B32B 3/30* (2006.01)
*B32B 18/00* (2006.01)
*B32B 27/06* (2006.01)
*B32B 33/00* (2006.01)

(52) U.S. Cl.
USPC ........... 428/142; 428/215; 428/336; 428/521; 428/702

(58) Field of Classification Search
None
See application file for complete search history.

(56) References Cited

U.S. PATENT DOCUMENTS

| 6,495,253 | B1 | 12/2002 | Koyama et al. |
| 6,937,230 | B2 | 8/2005 | Hatakeda et al. |
| 2003/0112520 | A1* | 6/2003 | Takahashi et al. ............ 359/603 |
| 2005/0118922 | A1 | 6/2005 | Endo |
| 2006/0013967 | A1* | 1/2006 | Mikoshiba et al. ............ 428/1.1 |

FOREIGN PATENT DOCUMENTS

| EP | 1 787 795 A1 | 5/2007 |
| JP | 63-61283 A | 3/1988 |
| JP | 10-323931 A | 12/1998 |
| JP | 2001-084839 A | 3/2001 |
| JP | 2002-163933 A | 6/2002 |

(Continued)

*Primary Examiner* — Ramsey Zacharia
(74) *Attorney, Agent, or Firm* — Sughrue Mion, PLLC

(57) ABSTRACT

This invention aims to provide a transparent conductive laminate excellent in sliding durability, edge-writing durability, finger writing durability and light resistance and suitable as a movable electrode substrate for a touch panel. Further, it aims to provide a touch panel using the above transparent conductive laminate. This invention is a transparent conductive laminate that is a laminate formed by laminating a polymer film, a cured resin layer-1 and a transparent conductive layer in this order, the cured resin layer-1 having concavoconvex shapes formed by phase separation of two components and containing no fine particles that impart concavoconvex shapes, and the cured resin layer-1 having an arithmetic average roughness (Ra), measured according to JIS B0601-1994, of 0.05 µm or more but less than 0.5 µm and a ten-point average roughness (Rz), measured according to JIS B0601-1982, of 0.5 µm or more but less than 2.0 µm, and a touch panel using the transparent conductive laminate.

16 Claims, 2 Drawing Sheets

— Cured resin layer-2
— Polymer film
— Cured resin layer-1
— Metal oxide layer
— Transparent conductive layer — Transparent conductive layer
— Glass substrate

(56) References Cited

FOREIGN PATENT DOCUMENTS

| | | |
|---|---|---|
| JP | 2002-373056 A | 12/2002 |
| JP | 2006-190508 A | 7/2006 |
| JP | 2006-190509 A | 7/2006 |
| JP | 2006-190510 A | 7/2006 |
| JP | 2006-190511 A | 7/2006 |
| JP | 2006-190512 A | 7/2006 |
| JP | 2006-252875 A | 9/2006 |
| WO | 2005-073763 A1 | 8/2005 |

* cited by examiner

TRANSPARENT CONDUCTIVE LAMINATE AND TOUCH PANEL

TECHNICAL FIELD

This invention relates to a transparent conductive laminate. More specifically, it relates to a transparent conductive laminate having concavoconvex shapes in a surface without containing any fine particles in a cured resin layer, and a touch panel using the transparent conductive laminate.

BACKGROUND ART

In recent years, many touch panels that materialize an interactive input system have been used as one of man-machine interfaces. With regard to a position-sensing method, the touch panels include touch panels according to optical, ultrasonic, capacitance and resistant film systems, etc. Of these, the resistant film system is simple and excellent in the price/performance ratio and is hence rapidly spread in recent years.

A touch panel according to a resistant film system is an electronic part having a constitution in which two films or sheets having a transparent conductive layer each on facing sides are held at a constant distance from each other. A movable electrode substrate (electrode substrate on a viewing side) is pressed and dented with a pen or a finger to bring it into contact, and electrically connect it, with a fixed electrode substrate (electrode substrate on an opposed side), whereby a sensor circuit senses a position to input as predetermined. In this case, interference fringes called Newton rings can appear around a pressed portion. Further, even in a non-pressed state, Newton rings can sometimes appear where a distance between the movable electrode substrate and the fixed electrode substrate is decreased by the flexure of the movable electrode substrate. When Newton rings appear, the visibility of a display is degraded.

As a method for reducing Newton rings that appear between the two transparent electrode substrates constituting a touch panel according to a resistant film system, there is disclosed a method in which a coating layer containing a filler having an average primary particle diameter of 1 to 4 μm and a transparent conductive layer are formed on a plastic film (see Patent Document 1). Further, there is also disclosed a method in which a projected coating layer (layer having projections) containing silica particles having an average secondary particle diameter of 1.0 to 3.0 μm is formed on a plastic film (see Patent Document 2).

When a touch panel uses a transparent conductive laminate in which a coating layer containing particles having an average primary particle diameter or average secondary particle diameter of about several μm and a transparent conductive layer are formed on a plastic film, the development of Newton rings are reduced. When the above touch panel is set on a high-definition display in recent years, a resin around particles in the above coating layer performs a lens effect, whereby there is caused a problem that the separation (flicker) of a color from the display is caused and that the visibility of the display is badly degraded.

As other coating layer for reducing the Newton rings, there is a Newton-Rings-preventing layer (anti-Newton-rings layer) using a resin containing two or more matting agents having different average particle diameters and a binder (see Patent Document 3).

An anti-Newton-rings layer formed by the above method can prevent the flicker on a high-definition display. Both of particles having an average particle diameter of 1 to 15 μm and fine particles having an average particle diameter of 5 to 50 nm are added for the purpose of matting. Essentially, since fine particles having a size of 5 to 50 nm are much smaller than the wavelength of visible light, no haze occurs even when fine particles of this size are incorporated into a resin that constitutes a binder. However, when Examples and Comparative Examples described in Patent Document 3 are compared, the haze is increased by the addition of fine particles having a size of 5 to 50 nm, so that it is assumed that the fine particles form secondary aggregates. It is seen that the flicker is controlled by an increase in the haze, i.e., matting. An anti-Newton-rings layer formed by the above method has a problem that visibility of a display is degraded due to an increase in haze.

Patent Documents 1 to 3 disclose methods for forming an anti-Newton-rings layer for preventing Newton rings that appear due to a gap between the movable electrode substrate and fixed electrode substrate of a touch panel. However, the anti-Newton-rings layer formed by these methods contains inorganic or organic fine particles thereby to form concavoconvex shapes. Therefore, a surface on which the transparent conductive layer is formed has numerous projections of the inorganic or organic fine particles, and when a sliding durability or edge-writing durability test required of a touch panel is carried out, there is a problem that the transparent conductive layer starts to deteriorate or peel off at projection portions formed of the inorganic or organic fine particles, which finally leads to a decrease in the electric properties of a touch panel.

Further, when a push point durability test is carried out, the projections formed of the inorganic or organic fine particles contained in the anti-Newton-rings layer of the movable electrode substrate destroy dot spacers formed on the fixed electrode substrate to spread them inside a touch panel. Broken pieces of the thus-spread dot spacers hinder the electric connection between the movable electrode substrate and the fixed electrode substrate, and they adhere to and damage the transparent conductive layer, so that there is also a problem that the electric property of a touch panel is degraded.

Further, when an anti-Newton-rings layer formed by incorporating these inorganic or organic fine particles is used as a fixed electrode substrate, projections formed of the inorganic or organic fine particles adhere to and damage the transparent conductive layer of the movable electrode substrate, which leads again to a problem that the electric property of a touch panel is degraded.

Meanwhile Patent Document 4 discloses an antiglare film material containing no fine particles, while it discloses nothing concerning the application thereof to a transparent conductive laminate.

(Patent Document 1) JP 10-323931 A
(Patent Document 2) JP 2002-373056 A
(Patent Document 3) JP 2001-84839 A
(Patent Document 4) WO2005/073763

DISCLOSURE OF THE INVENTION

It is an object of this invention to provide a transparent conductive laminate having concavoconvex shapes on a cured resin layer and having its flicker decreased without incorporating fine particles to impart concavoconvex shapes. It is another object of this invention to provide a transparent conductive laminate that is excellent in sliding durability, edge-writing durability, a finger-push durability and light resistance when used as a movable electrode substrate of a touch panel. Further, it is still another object of this invention to provide a transparent conductive laminate of which the adherence and damaging to a movable electrode substrate are reduced when used as a fixed electrode substrate of a touch panel. Further, it is yet another object of this invention to provide a touch panel using the above transparent conductive laminate.

The present inventors have made diligent studies in the light of the above prior art and arrived at this invention.

That is, this invention is a transparent conductive laminate that is a laminate formed by laminating a polymer film, a cured resin layer-1 and a transparent conductive layer in this order, the cured resin layer-1 having concavoconvex shapes formed by phase separation of two components and containing no fine particles that impart concavoconvex shapes, and the cured resin layer-1 having an arithmetic average roughness (Ra), measured according to JIS B0601-1994, of 0.05 μm or more but less than 0.5 μm and a ten-point average roughness (Rz), measured according to JIS B0601-1982, of 0.5 μm or more but less than 2.0 μm.

Of the two components forming the cured resin layer-1, preferably, the first component is an unsaturated double bond acryl copolymer, and the second component is a polyfunctional unsaturated-double-bond-containing monomer. Further, preferably, the SP value (SP1) of the first component and the SP value (SP2) of the second component satisfy SP1<SP2.

The transparent conductive laminate of this invention preferably has a cured resin layer-2 on the surface of the polymer film opposite to the surface where the transparent conductive layer is formed, the cured resin layer-2 having concavoconvex shapes formed by phase separation of two components and containing no fine particles that impart concavoconvex shapes, and the cured resin layer-2 having an arithmetic average roughness (Ra), measured according to JIS B0601-1994, of 0.05 μm or more but less than 0.50 μm and a ten-point average roughness (Rz), measured according to JIS B0601-1982, of 0.5 μm or more but less than 2.0 μm.

Of the two components forming the cured resin layer-2, preferably, the first component is an acryl copolymer containing an unsaturated double bond, and the second component is a polyfunctional unsaturated-double-bond-containing monomer. Further, preferably, the SP value (SP1) of the first component and the SP value (SP2) of the second component satisfy SP1<SP2. Preferably, the second component in the cured resin layer-2 is a monomer having 3 to 6 mole equivalent amount, per molecule, of an alkylene oxide unit having 2 to 4 carbon atoms and containing a trifunctional or higher polyfunctional unsaturated double bond. The cured resin layer-2 preferably contains 2 to 40% by weight of the polyfunctional unsaturated-double-bond-containing monomer In the transparent conductive laminate of this invention, preferably, the haze defined in JIS K 7136 is 2% or more but less than 20%. Preferably, the transparent conductive laminate of this invention has a 0.5 nm or more but less than 5 nm thick metal oxide layer between the cured resin layer-1 and the transparent conductive layer. In the transparent conductive laminate of this invention, preferably, the transparent conductive layer has a thickness of 5 nm or more but 50 nm or less and is crystalline.

Preferably, the transparent conductive laminate of this invention has a cured resin layer-3 having a refractive index of 1.2 to 1.55 and a thickness of 0.05 μm or more but 0.5 μm or less between the cured resin layer-1 and the transparent conductive layer. Preferably, the transparent conductive laminate of this invention has a cured resin layer-3 having a refractive index of 1.2 to 1.55 and a thickness of 0.05 μm or more but 0.5 μm or less between the cured resin layer-1 and the metal oxide layer.

Preferably, the transparent conductive laminate of this invention has an optical interference layer formed of a low-refractivity layer and a high-refractivity layer between the cured resin layer-1 and the transparent conductive layer, and the low-refractivity layer is in contact with the transparent conductive layer. Preferably, the transparent conductive laminate of this invention has an optical interference layer formed of a low-refractivity layer and a high-refractivity layer between the cured resin layer-1 and the metal oxide layer, and the low-refractivity layer is in contact with the transparent conductive layer.

This invention includes a touch panel having the above transparent conductive laminate. Further, this invention includes a touch panel in which two transparent electrode substrates having a transparent conductive layer formed on at least one surface each are arranged to ensure that the transparent conductive layers face each other, and which uses the above transparent conductive laminate as at least one of the transparent electrode substrates.

BEST MODE FOR CARRYING OUT THE INVENTION

Figure 1:
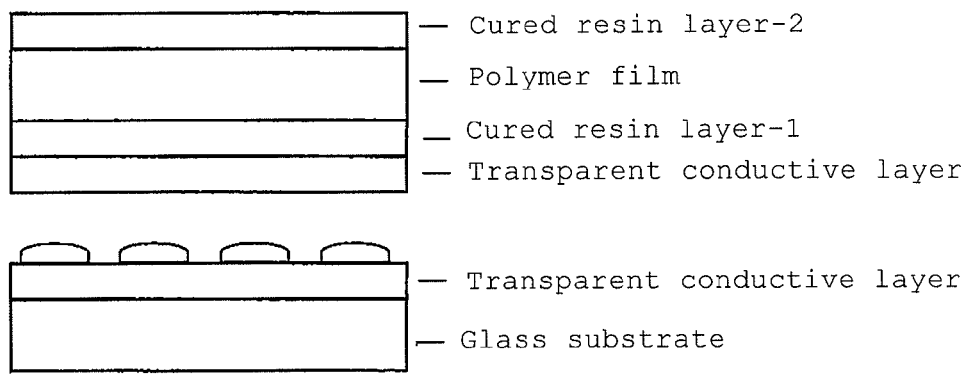
FIG. 1 shows one embodiment of layer structure of the transparent conductive laminate of this invention.

Preferred embodiments of the invention will be consecutively explained below.

<Cured Resin Layer-1>

The cured resin layer-1 has concavoconvex shapes formed by the phase separation of two components. The cured resin layer-1 contains no fine particles used for imparting the concavoconvex shapes.

When a composition containing a first component and a second component is applied onto a substrate, these two components undergo a phase separation to generate random concavoconvex shapes on a surface due to a physical property difference between the first and second components, whereby the above concavoconvex shapes are formed.

(First Component)

The first component is preferably a curable polymer excellent in transparency, more preferably a thermosetting polymer or an ionizing-radiation-curable polymer. The polymer can be selected from known polymers, and, it includes, for example, polymers described in International Publication No. 2005/073763.

The first component is preferably an acryl copolymer containing an unsaturated double bond (to be sometimes referred to as "copolymer (1-1)" hereinafter).

The copolymer (1-1) includes, for example, a copolymer obtained by reacting a resin prepared by polymerization or copolymerization of polymerizable unsaturated monomer(s) having an acid group such as (meth)acryl monomer, etc., or a resin prepared by polymerization or copolymerization of the above polymerizable unsaturated monomer having an acid group and other monomer having an ethylenically unsaturated double bond, with a monomer having an ethylenically unsaturated double bond and an epoxy group, and a copolymer obtained by reacting the above polymerizable unsaturated monomer having an acid group with other monomer having an ethylenically unsaturated double bond and an isocyanate group.

As a specific method for preparing an acryl copolymer containing an unsaturated double bond, for example, there can be a method in which a polymerizable unsaturated monomer having an acid group and other polymerizable unsaturated monomer are copolymerized, and then the acid group of the resultant copolymer and the epoxy group of an ethylenically unsaturated monomer containing an epoxy group are reacted.

Examples of the polymerizable unsaturated monomer having an acid group include monocarboxylic acids such as acrylic acid, methacrylic acid, crotonic acid, 2-(meth)acryloyloxyethyl succinic acid, 2-(meth)acryloyloxyethyl phthalic acid and 2-(meth) acryloyloxyethyl hexahydrophthalic acid, dicarboxylic acids such as maleic acid, fumaric acid, citraconic acid, mesaconic acid and itaconic acid, monoesters of acid anhydrides such as maleic anhydride and itaconic anhydride and monoester of dicarboxylic acids such as monoethyl maleate, monoethyl fumarate and monoethyl itaconate, substitution derivatives of these substituted with haloalkyl, alkoxy, halogen, nitro or cyano in an α-position, o-, m- and p-vinyl benzoic acids and substitution derivatives of these substituted with alkyl, alkoxy, halogen, nitro, amide or ester. These may be used singly, or two or more of these may be used in combination.

As other polymerizable unsaturated monomer, there can be used styrene or substitution derivatives of styrene substituted with alkyl, alkoxy, halogen, haloalkyl, nitro, cyano, amide or ester in an α-, o- or m-position) of styrene; olefins such as butadiene, isoprene, neoprene, etc.; o-, m- and p-hydroxystyrenes or substitution derivatives of these substituted with alkyl, alkoxy, halogen, haloalkyl, nitro, cyano, amide, ester or carboxy; polyhydroxyvinyl phenols such as vinyl hydroquinone, 5-vinylpyrogallol, 6-vinylpyrogallol, 1-vinylfluoroglycinol, etc.; methyl, ethyl, n-propyl, i-propyl, n-butyl, sec-butyl, tert-butyl, pentyl, neopentyl, isoamylhexyl, cyclohexyl, adamantyl, allyl, propargyl, phenyl, naphthyl, anthracenyl, antraquinonyl, piperonyl, salicyl, cyclohexyl, benzyl, phenethyl, cresyl, glycidyl, isobornyl, triphenylmethyl, dicyclopentanyl, cumyl, 3-(N,N-dimethylamino)propyl, 3-(N,N-dimethylamino)ethyl, furyl or furfuryl ester of methacrylic acid or acrylic acid; anilide or amide of methacrylic acid or acrylic acid or N,N-dimethyl, N,N-diethyl, N,N-dipropyl, N,N-diisopropyl or anthranylamide of methacrylic acid or acrylic acid; acrylonitrile, acrolein, methacrylonitrile, vinyl chloride, vinylidene chloride, vinyl fluoride, vinylidene fluoride, N-vinylpyrrolidone, vinylpyridine, vinyl acetate, N-phenylmaleimide, N-(4-hydroxyphenyl)maleimide, N-methacyloylphthalimide, N-acryloylphthalimide, etc.

Examples of the epoxy-containing ethylenically unsaturated monomer include glycidyl (meth)acrylate, β-methylglycidyl (meth)acrylate, and 3,4-epoxycyclohexanyl (meth) acrylate and 4-hydroxybutyl acrylate glycidyl ethers. It is preferred to use glycidyl (meth)acrylate since it forms a composition that exhibits well-balanced curability and shelf stability.

Further, as a specific method for preparing the acryl copolymer containing an unsaturated double bond, for example, there can be a method in which an ethylenically unsaturated monomer containing an epoxy group and other polymerizable unsaturated monomer are polymerized, and then the epoxy group of the thus-obtained copolymer and the acid group of a polymerizable unsaturated monomer having an acid group are reacted.

In this invention, the weight average molecular weight of the acryl copolymer containing an unsaturated double bond for use as a first component is preferably 500 to 100,000, more preferably 1,000 to 50,000. The weight average molecular weight in the present specification means a weight average molecular weight calculated in terms of polystyrene. Further, the acryl copolymers containing an unsaturated double bond may be used singly, or two or more of them may be used in combination.

(Second Component)

The second component can be any monomer so long as it undergoes phase separation when mixed with the copolymer (1-1). The monomer can be selected from known monomers, and for example, it includes monomers described in International Publication No. 2005/073763.

As a second component, a polyfunctional unsaturated-double-bond-containing monomer (to be sometimes referred to as monomer (1-2) hereinafter) is preferred. The monomer (1-2) includes a dealcoholization reaction product of a polyhydric alcohol and (meth)acrylate. Specifically, it includes pentaerythritol triacrylate, dipentaerythritol hexa(meth)acrylate, dipentaerythritol penta(meth)acrylate, trimethylolpropane tri(meth)acrylate, ditrimethylolpropane tetra(meth) acrylate, neopentyl glycol di(meth)acrylate, etc. In addition to these, there can be employed acrylate monomers having a polyethylene glycol structure each, such as Polyethylene Glycol #200 Diacrylate (supplied by KYOEISHA CHEMICAL CO., LTD.), etc. These polyfunctional unsaturated-double-bond-containing monomers may be used singly, or a mixture of two or more of them may be also used.

Of the two components forming the cured resin layer-1, preferably, the first component is an acryl copolymer containing an unsaturated double bond, and the second component is a polyfunctional unsaturated-double-bond-containing monomer.

(Solubility Parameter Value: Sp Value)

Further, the first component and the second component preferably have different solubility parameter values (SP values). When the first component is a copolymer (1-1) and when the second component is a monomer (1-2), preferably, the SP value (SP1) of the first component and the SP value (SP2) of the second component satisfy SP1<SP2. Further, the above different is preferably 0.5 or more.

In particular, it is preferred that the first component should be a copolymer (1-1) and that the second component should be a monomer (1-2), since a touch panel using the transparent conductive laminate of this invention is free from flicker, has a low haze and is remarkably improved in sliding durability and edge-writing durability.

(Surface Roughness)

In the transparent conductive laminate of this invention, the cured resin layer-1 has an arithmetic average roughness (Ra), measured according to JIS B0601-1994, of 0.05 μm or more but less than 0.5 μm. Further, the cured resin layer-1 has a ten-point average roughness (Rz), measured according to JIS B0601-1982, of 0.5 μm or more but less than 2 μm.

When Ra and Rz are in the above ranges, a touch panel using the transparent conductive laminate is excellent in an antiglare property, an anti-Newton-Rings property and removability of a fingerprint mark by wiping it off, and the flicker is reduced. For more improving the above properties, the range of Ra is preferably 0.1 μm or more but less than 0.4 μm, particularly preferably 0.1 μm or more but less than 0.35 μm. Further, the range of Rz is preferably 0.7 μm or more but less than 1.5 μm, particularly preferably 0.7 μm or more but less than 1.3 μm.

(Thickness)

In this invention, the thickness of the cured resin layer-1 is preferably 10 μm or less. When the thickness exceeds 10 μm, the flexibility is insufficient, and a touch panel using a transparent conductive laminate having such a cured resin layer is sometimes poor in sliding durability and edge-writing durability. For more improving the above properties, the thickness of the cured resin layer-1 is preferably 8 μm or less, particularly preferably 6 μm or less.

(Formation of Cured Resin Layer-1)

The cured resin layer-1 can be formed by applying a coating liquid containing the first component and the second component onto a substrate, optionally drying an applied coating liquid and then curing the applied coating liquid by irradiation with ionizing radiation, heat treatment, etc. The coating liquid preferably contains an organic solvent.

As an application method, there can be employed a method using a known application machine such as a doctor knife, a bar coater, a gravure roll coater, a curtain coater, a knife coater, a spin coater, etc., a spray method, an immersion method, etc. When cured resin layers-1 are formed on both surfaces of a polymer film, the cured resin layer-1 may have the same compositions or may have different compositions.

<Polymer Film>

The polymer film for use in this invention is not specially limited so long as it is a film formed of a transparent organic polymer. Examples of the organic polymer include polyester resins such as polyethylene terephthalate, polyethylene-2,6-naphthalate, polydiallyl phthalate, etc., a polycarbonate resin, a polyether sulfone resin, a polysulfone resin, a polyarylate resin, an acrylic resin, a cellulose acetate resin, a cycloolefin polymer, etc. These may be used as a homopolymer or a copolymer. The above organic polymers may be used singly, or a blend of some of them may be also used.

Polymer films of these are formed suitably by a general melt-extrusion method, a solution casting method, etc., while a formed film is preferably monoaxially stretched or biaxially stretched as required in order to increase its mechanical strength or optical function.

When the transparent conductive laminate of this invention is used as a movable electrode substrate of a touch panel, preferably, the thickness of the polymer film is 75 to 400 μm from the viewpoint of the flexibility required for working the touch panel as a switch and the strength required for maintaining flatness. When the transparent conductive laminate of this invention is used as a fixed electrode substrate, preferably, the thickness of the polymer film is 0.1 to 4.0 mm from the viewpoint of the strength required for maintaining flatness. The polymer film may have a monolayer constitution or may have a laminate constitution of two or more layers. Further, there may be also employed a constitution in which a 50 to 400 μm thick transparent conductive laminate of this invention and other plastic sheet are attached to each other and the entire fixed electrode substrate has a thickness of 0.1 to 4.0 mm.

When the transparent conductive laminate of this invention is used as a movable electrode substrate of a touch panel, there may be used a fixed electrode substrate obtained by forming a transparent conductive layer on the above polymer film, a plastic sheet, a glass substrate, a laminate of the polymer film and a plastic sheet or a laminate of the polymer film and a plastic sheet. From the viewpoint of the strength and weight of a touch panel, the thickness of the entire fixed electrode substrate is preferably 0.1 to 4.0 mm.

Further, there has been recently developed a new-type touch panel having a constitution in which a polarizing plate alone or a combination of a polarizing plate and a retardation film is stacked on an input side surface of a touch panel, i.e., a user side surface. The advantage of this constitution is that the reflectance of extraneous light inside a touch panel is reduced to half or less owing to the optical activity of the polarizing plate or a combination of the polarizing plate and the retardation film, and that the contrast of a display in which the touch panel is incorporated is improved.

In a touch panel of the above type, polarized light passes through a transparent conductive laminate, so that it is preferred to use a polymer film excellent in optical isotropy. Specifically, when a polymer film has a refractive index nx in the slow axis direction, a refractive index ny in the fast axis direction and a film thickness of d (nm), the in-plane retardation value Re represented by Re=(nx−ny)×d (nm) is preferably at least 30 nm or less, more preferably 20 nm or less. The above in-plane retardation value of a polymer film is represented by a value at a wavelength of 590 nm measured with a spectral ellipsometer (M-150, supplied by JASCO CORPORATION).

In the field of use in a touch panel of type where polarized light passes through a transparent conductive laminate as shown above, the in-plane retardation value of a polymer film is very important. In addition to this, the three-dimensional refractivity property of a polymer film, that is, the K value expressed by K={(nx+ny)/2−nz}×d in which nz is a refractive index in the thickness direction of the polymer film is preferably −250 to +150 nm, more preferably in the range of −200 to +100 nm for attaining an excellent view angle property of a touch panel.

The resin for constituting a polymer film excellent in optical isotropy includes, for example, thermoplastic resins such as polycarbonate, amorphous polyarylate, polyether sulfone, polysulfone, triacetyl cellulose, diacetyl cellulose, a cycloolefin polymer and modified products of these or copolymers of these with different materials, thermosetting resins such as an epoxy resin, ionizing radiation curable resins such as an acrylic resin. In view of moldability, a production cost, thermal stability, etc., for example, polycarbonate, amorphous polyarylate, polyether sulfone, polysulfone, a cycloolefin polymer, modified products of these and copolymers of these with other materials are the most preferred.

More specifically, the above resin is, for example, a polymer or copolymer containing, as monomer unit(s), at least one component selected from the group consisting of bisphenol A, 1,1-di(4-phenol)cyclohexylidene, 3,3,5-trimethyl-1,1-di(4-phenol)cyclohexylidene, fluorene-9,9-di(4-phenol), fluorene-9,9-di(3-methyl-4-phenol), etc., or a mixture of polymers or copolymers containing, as monomer unit(s), at least one component selected from the above group. Polycarbonate having an average molecular weight in the range of 15,000 to 100,000 is preferably used. Examples of the polycarbonate include "Panlite (registered trademark" supplied by Teijin Chemicals, Ltd., "Apec HT (registered trademark)" supplied by Bayer AG., etc.

Examples of the amorphous polyarylate include "ELMECH (registered trademark)" supplied by Kaneka Corporation, "U Polymer (registered trademark)" supplied by UNITIKA LTD., "ISARYL (registered trademark)" supplied by ISONOVA Corporation, etc.

Further, examples of the cycloolefin polymer include "ZEONOR (registered trademark)" supplied by ZEON CORPORATION, "ARTON (registered trademark)" supplied by JSR Corporation, etc.

As a method for molding these resins, methods such as a melt-extrusion, a solution casting and injection molding can be employed, while the molding is particularly preferably carried out using a solution casting method or a melt-extrusion method with a view to attaining excellent optical isotropy.

<Transparent Conductive Layer>

In this invention, the transparent conductive layer is not specially limited so long as it is a transparent layer excellent in conductivity.

Examples of a component for constituting the transparent conductive layer include silicon oxide, aluminum oxide, titanium oxide, magnesium oxide, zinc oxide, indium oxide, tin oxide, etc. Of these, indium oxide and/or tin oxide are/is particularly preferred.

Further, the transparent conductive layer is preferably a crystalline layer composed mainly of indium oxide, and a layer formed of crystalline ITO (Indium Tin Oxide) is particularly preferably used. There is no special need to impose an upper limit on the crystal grain diameter, while it is preferably 3,000 nm or less. When the crystal grain diameter exceeds 3,000 nm, undesirably, the writing durability is poor. The above crystal grain diameter is defined as one that diagonal line or diameter of fine crystals having the form of a polygon or an ellipse in each region observed through a transmission electron microscope (TEM) is the largest.

In this invention, "being composed mainly of indium oxide" means indium oxide containing, as a dopant, tin, tellurium, cadmium, molybdenum, tungsten, fluorine, zinc, etc., or indium oxide containing, as a dopant, silicon, titanium, zinc, etc., in addition of tin.

Further, "a crystalline layer" means that 50% or more, preferably 75% or more, more preferably 95% or more, particularly preferably about 100% of a layer formed of dopant-containing indium oxide is of a crystalline phase. When the transparent conductive layer is a crystalline layer, the adhesion between the cured resin layer-1 and the transparent conductive layer and the environmental reliability are excellent. As a result, when the transparent conductive laminate of this invention is used in a touch panel, the environmental reliability required of the touch panel and the writing durability of the touch panel are improved.

The transparent conductive layer can be formed by a known method, and the method can be selected, for example, from physical vapor deposition methods ("PVD" hereinafter) such as a DC magnetron sputtering method, an RF magnetron sputtering method, an ion plating method, a vacuum vapor deposition method, a pulse laser deposition method, etc. When emphasis is laid on the industrial productivity of forming a transparent conductive layer having a uniform thickness on a large area, a DC magnetron sputtering method is desirable. In addition to the above physical vapor deposition methods (PVD), there can be employed chemical formation methods such as chemical vapor deposition ("CVD" hereinafter), a sol gel method, etc., while sputtering methods are still desirable from the viewpoint of thickness control.

As other method for forming the transparent conductive layer, there can be used methods using known coating machines such as a doctor knife, a bar coater, a gravure roll coater, a curtain coater, a knife coater, a spin coater, etc., a spray method, an immersion method, etc. When the transparent conductive layer is actually formed by these methods, there is used a conductive coating agent comprising a conductive substance component such as ultrafine particles formed of a known conductive polymer material including polythiophene, alanine, etc., and/or a metal having conductivity, metal oxide, carbon, etc., and/or nano-wires formed of a metal having conductivity, metal oxide, carbon and a curing resin component as a binder.

There can be employed a method in which a coating liquid prepared by dissolving the above conductive coating agent in various organic solvents and adjusting its concentration and viscosity is applied onto a polymer film, and a layer is formed by irradiation with radiation, heat treatment, etc.

The thickness of the transparent conductive layer is preferably 5 to 50 nm from the viewpoint of transparency and conductivity. It is more preferably 5 to 30 nm. When the thickness of the transparent conductive layer is less than 5 nm, the stability of a resistance value with time tends to be poor. When it exceeds 50 nm, the surface resistance value decreases, which is not preferred for use in a touch panel. It is preferred to use a transparent conductive layer that exhibits a surface resistance value in the range of 100 to 2,000$\Omega$/□ ($\Omega$/sq), more preferably 140 to 1,000$\Omega$/□ ($\Omega$/sq), when it has a thickness of 5 to 50 nm.

Preferably, the transparent conductive layer has a thickness of 5 nm or more but 50 nm or less and is crystalline.

<Cured Resin Layer-2>

In this invention, the transparent conductive laminate preferably has a cured resin layer-2 on the surface of the polymer film opposite to the surface where the transparent conductive layer is formed. The cured resin layer-2 is a layer having concavoconvex shapes formed by phase separation of two components and containing no fine particles to impart concavoconvex shapes.

The SP value (SP1) of the first component for forming the cured resin layer-2 and the SP value (SP2) of the second component preferably satisfy SP1<SP2.

In the cured resin layer-2, its arithmetic average roughness (Ra) defined according to JIS B0601-1994 is in the range of 0.05 μm or more but less than 0.50 μm and its ten-point average roughness (Rz) defined according to JIS B0601-1982 is in the range of 0.5 μm or more but less than 2.0 μm.

When Ra and Rz are in the above ranges, a touch panel using the transparent conductive laminate is excellent in an antiglare property and removability of a fingerprint mark by wiping it off, and the flicker is reduced. When Ra is 0.50 μm or more, the flicker and the removability of a fingerprint mark by wiping it off may possibly decrease, and the visibility of a display set under the touch panel may also possibly decrease. Further, when Ra is less than 0.05 μm, the antiglare property decreases. When Rz is 2.0 μm or more, the flicker and the removability of a fingerprint mark by wiping it off may possibly decrease, and the visibility of a display set below the touch panel may also possibly decrease. When Rz is less than 0.5 μm, the antiglare property decreases.

For more improving the above properties, Ra is preferably in the range of 0.10 μm or more but less than 0.40 μm, particularly preferably 0.10 μm or more but less than 0.35 μm. Further, Rz is preferably in the range of 0.7 μm or more but less than 1.5 μm, particularly preferably 0.7 μm or more but less than 1.3 μm.

The first component for the cured resin layer-2 is an acryl copolymer (copolymer (2-1)) selected from the above unsaturated double bond acryl copolymers (copolymer (1-1)). In the transparent conductive laminate of this invention, the first component (copolymer (2-1)) for the cured resin layer-2 may be the same as the first component for cured resin layer-1 or may be different from it in kind and composition.

The second component for the cured resin layer-2 is preferably an unsaturated-double-bond-containing monomer (to be sometimes referred to as monomer (2-2) hereinafter) that is included in the above polyfunctional unsaturated-double-bond-containing monomers and that is in particular a trifunctional or higher unsaturated-double-bond-containing monomer having, per molecule of the monomer, 3 to 6 mole equivalent amount of alkylene oxide units having 2 to 4 carbon atoms.

When the transparent conductive laminate of this invention is used as a movable electrode substrate of a touch panel, it is sometimes required to have weatherability (light resistance). In this case, the monomer (2-2) is preferred as a second component for the cured resin layer-2.

The monomer (2-2) can be prepared by introducing an alkylene oxide structure having 2 to 4 carbon atoms into a trifunctional or higher polyhydric alcohol and reacting it with a (meth)acrylate.

As a monomer (2-2), for example, there can be monomers of the following formula (A).

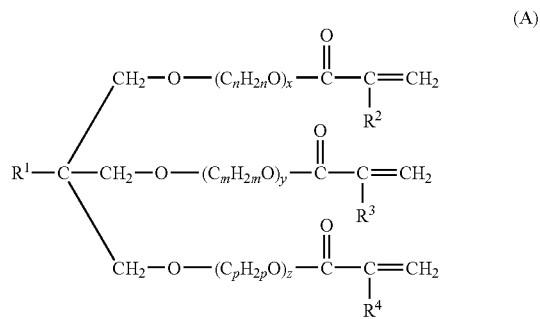

In the formula (A), each of n, m and p is independently an integer of 2 to 4. Each of x, y and z is independently an integer of 0 to 3, provided that the total sum of x, y and z is 3 to 6. $R^1$ is an alkyl group having 1 to 3 carbon atoms which may have a hydroxyl group. Each of $R^2$, $R^3$ and $R^4$ is independently hydrogen or methyl group.

Examples of the monomer (2-2) include triethylene glycol-trimethylolpropane tri(meth)acrylate, tripropylene glycol-trimethylolpropane tri(meth)acrylate, hexaethylene glycol-trimethylolpropane tri(meth)acrylate, hexapropylene glycol-trimethylolpropane tri(meth)acrylate, etc.

When the monomer (2-2) is used as the second component in the cured resin layer-2, the cured resin layer-2 can be further imparted with weatherability (light resistance), and as a result, there can be obtained a transparent conductive laminate in which the cured resin layer having weatherability (light resistance) is formed on the surface opposite to the surface where the transparent conductive layer is formed.

As the second component, it is preferred to use the monomer (2-2) and other polyfunctional unsaturated-double-bond-containing monomer in combination. When used in combination, other polyfunctional unsaturated-double-bond-containing monomer can secure the hardness of the cured resin layer-2.

As polyfunctional unsaturated-double-bond-containing monomer except for the monomer (2-2), for example, there can be a trifunctional or higher polyfunctional unsaturated-double-bond-containing monomer that is a dealcoholization reaction product of a polyhydric alcohol and (meth)acrylate. Specifically, it includes pentaerythritol (meth)acrylate, dipentaerythritol tetra(meth)acrylate, dipentaerythritol hexa(meth)acrylate, dipentaerythritol penta(meth)acrylate, trimethylolpropane tri(meth)acrylate, ditrimethylolpropane tetra(meth)acrylate, neopentyl glycol di(meth)acrylate, etc.

The content of the monomer (2-2) in the cured resin layer-2 is preferably 2 to 40% by weight. When the content of the monomer (2-2) is less than 2% by weight, there may be produced an insufficient effect on the improvement of the weatherability (light resistance) of the cured resin layer-2. When the content of the monomer (2-2) exceeds 40% by weight, the surface hardness of the cured resin layer-2 may decrease.

In this invention, the thickness of the cured resin layer-2 is preferably 10 μm or less. When the thickness exceeds 10 μm, it may be insufficient in flexibility, and a touch panel using it may be poor in sliding durability and edge-writing durability. The thickness of the cured resin layer-2 is preferably 8 μm or less, particularly preferably 6 μm or less.

The cured resin layer-2 can be formed by applying a coating liquid containing the first component and the second component onto a substrate, drying the applied coating liquid as required, and then curing it by irradiation with ionizing radiation, heat treatment, etc. The coating liquid preferably contains an organic solvent.

As a method for the above coating, there can be methods using known coating machines such as a doctor knife, a bar coater, a gravure roll coater, a curtain coater, a knife coater, a spin coater, etc., a spray method, an immersion method, etc.

When the cured resin layer-2 is formed on only one surface of the polymer film, the haze defined in JIS K7136 is preferably 2% or more but less than 18%, more preferably 3% or more but less than 15%, particularly preferably 3% or more but less than 10%. When the haze is 18% or more, the visibility of a display set below a touch panel may be possibly degraded. When the haze is less than 2%, the antiglare property is decreased.

<Metal Oxide Layer>

The transparent conductive laminate of this invention may further have a metal oxide layer having a thickness of 0.5 nm or more but less than 5 nm between the cured resin layer-1 and the transparent conductive layer.

When the polymer film, the cured resin layer-1, the metal oxide layer having a controlled thickness and the transparent conductive layer are consecutively stacked, the adhesion between one layer and another is greatly improved. A touch panel using the above transparent conductive laminate is further improved in writing durability that is required of touch panels in recent years, as compared with a case where no metal oxide layer is provided. When the thickness of the metal oxide layer is 5.0 nm or more, the metal oxide layer starts to exhibits mechanical properties as a continuous material, so that it is of no use to expect an improvement in the edge-writing durability required of a touch panel. When the thickness of the metal oxide layer is less than 0.5 nm, not only it is difficult to control the thickness, but also it is difficult to exhibit full adhesion between the cured resin layer-1 and the transparent conductive layer and the improvement in the writing durability required of a touch panel is sometimes insufficient.

Examples of the component for constituting the metal oxide layer include metal oxides such as silicon oxide, aluminum oxide, titanium oxide, magnesium oxide, zinc oxide, indium oxide, tin oxide, etc.

The above metal oxide layer can be formed by a known method, and the method can be selected, for example, from physical vapor deposition methods ("PVD" hereinafter) such as a DC magnetron sputtering method, an RF magnetron sputtering method, an ion plating method, a vacuum vapor deposition method, a pulse laser deposition method, etc. When emphasis is laid on the industrial productivity of forming a metal oxide layer having a uniform thickness on a large area, a DC magnetron sputtering method is desirable. In addition to the above physical vapor deposition methods (PVD), there can be employed chemical formation methods such as chemical vapor deposition ("CVD" hereinafter), a sol gel method, etc., while sputtering methods are still desirable from the viewpoint of thickness control.

As a target for use in the sputtering methods, a metal target is preferred, and it is widely employed practice to use a reactive sputtering method. That is because oxides of many elements for use as a metal oxide layer are insulating materials, and a DC magnetron sputtering method cannot be suited to such metal oxide targets. In recent years, there has been developed a power source to cause two cathodes to discharge simultaneously to keep an insulating material from being formed on a target, so that a quasi-RF magnetron sputtering method can be suited.

<Cured Resin Layer-3>

The transparent conductive laminate of this invention can have a cured resin layer-3 between the cured resin layer-1 and the transparent conductive layer. Further, it can also have a cured resin layer-3 between the cured resin layer-1 and the metal oxide layer.

The cured resin layer-3 improves adhesion between the above layers. As a curable resin for forming the cured resin layer-3, there can be an ionizing radiation curable resin, a thermosetting resin, etc.

As a monomer that gives the ionizing radiation curable resin, there can be monofunctional and polyfunctional acrylates such as polyol acrylate, polyester acrylate, urethane acrylate, epoxy acrylate, modified styrene acrylate, melamine acrylate, silicon-containing acrylate, etc.

Specific examples of the monomer include polyfunctional monomers such as trimethylolpropane trimethacrylate, trimethylolpropane ethylene oxide-modified acrylate, trimethylolpropane propylene oxide-modified acrylate, isocyanuric acid alkylene oxide-modified acrylate, pentaerythritol triacrylate, dipentaerythritol hexaacrylate, dimethylol tricyclodecane diacrylate, tripropylene glycol triacrylate, diethylene glycol diacrylate, 1,6-hexanediol diacrylate, epoxy-modified acrylate, urethane-modified acrylate, epoxy-modified acrylate, etc. These may be used singly, a mixture of some of them may be used, and a proper amount of hydrolysis product of various alkoxysilanes may be added. When polymerization for the resin layer is carried out by ionizing radiation, a proper amount of a known photopolymerization initiator is added. Further, a proper amount of a photosensitizer may be added as required.

The photopolymerization initiator includes acetophenone, benzophenone, benzoin, benzyl benzoate, thioxanthone, etc., and the photosensitizer includes triethylamine, tri-n-butylphosphine, etc, The thermosetting resin includes organosiloxane thermosetting resins obtained from silane compounds such as methyltriethoxysilane, phenyltriethoxysilane as a monomer, melamine thermosetting resins obtained from etherified methylolmelanmine, etc., as a monomer, a isocyanate thermosetting resin, a phenolic thermosetting resin, an epoxy thermosetting resin, etc. These thermosetting resins may be used singly, or some of them may be used in combination. Further, a thermoplastic resin may be added as required.

For crosslinking the resin layer by heat, proper amounts of a known reaction promoter and curing agent are added. The reactor promoter includes, for example, triethylamine, dibutyltin dilaurate, benzylmethylamine, pyridine, etc. The curing agent includes, for example, methylhexahydrophthalic anhydride, 4,4'-diaminodiphenylmethane, 4,4'-diamino-3,3'-diethyldiphenylmethane, diaminodiphenylsulfone, etc.

For enhancing adhesion between the cured resin layer-3 and the transparent conductive layer or the metal oxide layer, the cured resin layer-3 may contain silicon oxide ultrafine particles having an average primary particle diameter of 100 nm or less. Further, an organic compound containing silicon atoms and silicon oxide ultrafine particles having an average primary particle diameter of 100 nm or less are used in combination, the cured resin layer having the above silicon oxide ultrafine particles segregated on the surface of the layer is obtained, so that the effect on improvement of the above adhesion is further enhanced. The organic compound containing silicon atoms includes general surfactants containing silicon atoms and curable resin components. The content of the above silicon oxide ultrafine particles per 100 parts by weight of the curable resin component to be used for forming the cured resin layer-3 is preferably 1 part by weight or more but 400 parts by weight or less, more preferably 1 part by weight or more but 200 parts by weight or less, still more preferably 5 parts by weight or more but 100 parts by weight or less.

The cured resin layer-3 can be formed by applying a coating liquid containing the curable resin component onto the cured resin layer-1, drying the applied coating liquid as required, and then curing it by irradiation with ionizing radiation or heat treatment. The coating liquid preferably contains an organic solvent.

As a method for the above application, there can be methods using known coating machines such as a doctor knife, a bar coater, a gravure roll coater, a curtain coater, a knife coater, a spin cater, etc., a spray method, an immersion method, etc.

Examples of the organic solvent preferably include alcohol and hydrocarbon solvents such as ethanol, isopropyl alcohol, butanol, 1-methoxy-2-propanol, hexane, cyclohexane, ligroin, etc. In particular, it is preferred to use xylene, toluene or ketones such as methyl ethyl ketone, methyl isobutyl ketone, etc. In addition to these, polar solvents such as cyclohexanone, butyl acetate, isobutyl acetate, etc., can be also used. These can be used singly, or a solvent mixture of two or more of them can be used.

For preventing the thermal deterioration and photo-deterioration of the cured resin layer-3, an ultraviolet absorbent, an antioxidant, an age resistor, etc., can be added as well.

The optical properties (transmittance and color tone) of the transparent conductive laminate can be adjusted by controlling the thickness and refractive index of the cured resin layer-3. In this case, the thickness of the cured resin layer-3 is preferably 0.05 μm or more but 0.5 μm or less, more preferably 0.05 μm or more but 0.3 μm or less. For adjusting the refractive index of the cured resin layer-3, metal oxide or metal fluoride ultrafine particles having an average primary particle diameter of 100 nm or less and/or a fluorine-containing resin may be incorporated into the cured resin layer-3 singly or in combination. In this case, preferably, the refractive index of the cured resin layer-3 is lower than the refractive index of the polymer film, and the refractive index is preferably 1.2 or more but 1.55 or less, more preferably 1.2 or more but 1.45 or less.

Preferably, the transparent conductive laminate of this invention has a cured resin layer-3 having a refractive index of 1.2 to 1.55 and a thickness of 0.05 μm or more but 0.5 μm or less between the cured resin layer-1 and the transparent conductive layer. Further, preferably, the transparent conductive laminate of this invention has a cured resin layer-3 having a refractive index of 1.2 to 1.55 and a thickness of 0.05 μm or more but 0.5 μm or less between the cured resin layer-1 and the metal oxide layer.

(Optical Interference Layer)

Preferably, the transparent conductive laminate of this invention has an optical interference layer formed of a low-refractivity layer and a high-refractivity layer between the cured resin layer-1 and the transparent conductive layer, the low-refractivity layer being in contact with the transparent conductive layer. Further, preferably, the transparent conductive laminate of this invention has an optical interference layer formed of a low-refractivity layer and a high-refractivity layer between the cured resin layer-1 and the metal oxide layer, the low-refractivity layer being in contact with the metal oxide layer.

The optical interference layer may have a plurality of low-refractivity layers. Further, the optical interference layer may have a plurality of high-refractivity layers. The optical interference layer may also be formed of two or more units, each unit being formed of a combination of a high-refractivity layer and a low-refractivity layer. When the optical interference layer is composed of one high-refractivity layer and one low-refractivity layer, the thickness of the optical interference layer is preferably 30 nm to 300 nm, more preferably 50 nm to 200 nm. The optical interference layer improves the adhesion between the above layers and the optical properties of the transparent conductive laminate, in particular the transmittance and color tone.

The high-refractivity layer constituting the optical interference layer is preferably formed, for example, of a hydrolysis condensate of metal alkoxide. Further, the high-refractivity layer is preferably formed from at least one member selected from the group consisting of a hydrolysis condensate of a metal alkoxide, a thermosetting resin and an ionizing-radiation-curable resin and ultrafine particles formed of metal oxide and/or metal fluoride having an average primary particle diameter of 100 nm or less.

The metal alkoxide includes, for example, titanium alkoxide, zirconium alkoxide and alkoxysilane.

Examples of the titanium alkoxide include titanium tetraisopropoxide, tetra-n-propylorthotitanate, titanium tetra-n-butoxide, tetrakis(2-ethylhexyloxy)titanate, etc.

Examples of the zirconium alkoxide include zirconium tetraisopropoxide, zirconium tetra-n-butoxide, etc.

Examples of the alkoxysilane include tetramethoxysilane, tetraethoxysilane, methyltrimethoxysilane, methyltriethoxysilane, dimethyldimethoxysilane, γ-glycidoxypropyltrimethoxysilane, β-(3,4-epoxycyclohexyl)ethyltrimethoxysilane, vinyltrimethoxysilane, N-β(aminoethyl)γ-aminopropyltrimethoxysilane, N-β(aminoethyl)γ-aminopropyldimethoxysilane, γ-aminopropyltriethoxysilane, etc.

From the viewpoint of the mechanical strength and adhesion of the layer, solvent resistance, etc., it is preferred to use a mixture of two or more of these alkoxysilanes. In particular, from the viewpoint of solvent resistance, preferably, the content of alkoxysilane having an amino group in its molecule is in the range of 0.5 to 40 weight % based on the entire alkoxysilane composition.

The alkoxysilane may be used as a monomer, or may be used as an oligomer obtained by carrying out hydrolysis and dehydrative condensation beforehand to a proper extent.

The average primary particle diameter of the ultrafine particles is preferably 100 nm or less, more preferably 75 nm or less, still more preferably 50 nm or less. When the average primary particle diameter of the ultrafine particles is controlled to ensure that it is 100 nm or less, a coating layer is free from whitening.

Examples of the ultrafine particles include ultrafine particles of metal oxides or metal fluorides such as $Bi_2O_3$, $CeO_2$, $In_2O_3$, ($In_2O_3 \cdot SnO_2$), $HfO_2$, $La_2O_3$, $MgF_2$, $Sb_2O_5$, ($Sb_2O_5 \cdot SnO_2$), $SiO_2$, $SnO_2$, $TiO_2$, $Y_2O_3$, $ZnO$, $ZrO_2$, etc.

A proper amount of metal oxide or metal fluoride ultrafine particles having an average primary particle diameter of 100 nm or less can be added to the high-refractivity layer singly or in combination of two or more kinds of them. When the ultrafine particles are added, the refractive index of the high-refractivity layer can be adjusted.

When the ultrafine particles are added to the high-refractivity layer, the weight ratio of the ultrafine particles and the resin component is preferably 0:100-66.6:33.3, more preferably 0:100-60:40. When the weight ratio of the ultrafine particles and the resin component exceeds 66.6:33.3, undesirably, the strength and adhesion required of the optical interference layer are sometimes insufficient.

The thickness of the high-refractivity layer is preferably 15 to 250 nm, more preferably 30 to 150 nm. Preferably, the refractive index of the high-refractivity layer is greater than the refractive index of the low-refractivity layer to be described later and the cured resin layer-1, and the difference in refractive index is 0.2 or more.

The low-refractivity layer constituting the optical interference layer can be formed from an ionizing-radiation-curable resin to form the above cured resin layer-3, the above thermosetting resin or the above alkoxysilane to form the low-refractivity layer. For the purpose of enhancing the adhesion to the transparent conductive layer or metal oxide layer or adjusting the refractive index, a proper amount of metal oxide or metal fluoride ultrafine particles having an average primary particle diameter of 100 nm or less can be added to the low-refractivity layer singly or in combination of two or more kinds of them. As ultrafine particles for the above use, ultrafine particles of $SiO_2$, $MgF_2$, etc., having a low refractive index are proper. The thickness of the low-refractivity layer is preferably 15 to 250 nm, more preferably 30 to 150 nm.

The high-refractivity layer or the low-refractivity layer are formed by the following method. First, a coating liquid D of components for forming the high-refractivity layer dissolved in an organic solvent and a coating liquid C of components for forming the low-refractivity layer dissolved in an organic solvent are prepared. Then, the coating liquid D is applied onto the cured resin layer-1, and then the applied coating liquid is cured by irradiation with ionizing radiation, heat treatment, etc., to form the high-refractivity layer. Thereafter, the coating liquid C is applied onto the high-refractivity layer, and then the applied coating liquid is cured by irradiation with ionizing radiation, heat treatment, etc., to form the low-refractivity layer.

As an application method, there can be methods using known application machines such as a doctor knife, a bar coater, a gravure roll coater, a curtain coater, a knife coater, a spin coater, etc., a spray method, an immersion method, etc.

Examples of the organic solvent preferably include alcohol and hydrocarbon solvents such as ethanol, isopropyl alcohol, butanol, 1-methoxy-2-propanol, hexane, cyclohexane, ligroin, etc. In addition to these, polar solvents such as xylene, toluene, cyclohexanone, methyl isobutyl ketone, etc., can be also used. These can be used singly, or a solvent mixture of two or more of them can be used.

When the coating liquid contains a metal alkoxide, the metal alkoxide in the coating layer undergoes hydrolysis due to water, etc., in air, and then crosslinking proceeds by dehydrative condensation. Generally, it requires heat treatment to promote the crosslinking, and in the application step, it is preferred to carry out heat treatment at a temperature of 100° C. or higher for a few minutes or more. In some cases, the crosslinking degree can be improved by irradiating the coating layer with actinic ray such as ultraviolet ray, etc., concurrently with the above heat treatment.

<Transparent Conductive Laminate>

In the transparent conductive laminate of this invention, preferably, its haze defined in JIS K7136 is 2% or more but less than 20%. When the haze in this range, a touch panel using the transparent conductive laminate is excellent in an anti-Newton rings property and removability of a fingerprint mark by wiping it off.

The cured resin layer-1 and the transparent conductive layer are consecutively stacked on only one surface of the polymer film, the haze of the transparent conductive laminate of this invention is preferably 2% or more but less than 10%, more preferably 2% or more but less than 8%, particularly preferably 2% or more but less than 6%. When the haze is less than 2%, the anti-Newton rings property is liable to be low. When the haze is 10% or more, there is no special problem, while the visibility of a display set below the touch panel is liable to be degraded.

When the cured resin layers-1 are formed on both sides of the polymer film, or when the cured resin layer-1 and the cured resin layer-2 are formed on one surface each of the polymer film, the haze of the transparent conductive laminate of this invention is preferably 5% or more but less than 20%, more preferably 6% or more but less than 15%, particularly preferably 6% or more but less than 13%. Even when the haze value is less than 5%, no special influence is caused, while the antiglare property of the transparent conductive laminate may be possibly decreased. When it is 20% or more, the visibility of a display set below a touch panel may be probably degraded. When the haze is 5% or more but less than 20%, desirably, the visibility of the transparent conductive laminate is improved without a decrease in the antiglare property of the transparent conductive laminate.

In the transparent conductive laminate of this invention, preferably, its image clarity by a transmission technique using a 0.125 mm optical sieve defined in JIS K7105 (1999 edition) is 10% or more but 80% or less. More preferably, it is 20% or more but 75% or less. When the image clarity is less than 10%, there is caused a problem that the visibility of a display set under a touch panel is degraded or that the flicker is increased. When the image clarity is greater than 80%, there is caused a problem that the antiglare property and anti-Newton rings property are decreased.

In the transparent conductive laminate of this invention, preferably, the contact angle of the cured resin layer-2, which is formed on the surface opposite to the surface where the transparent conductive layer is formed, to water is preferably 90° or less, more preferably 80° or less. When the contact angle is 90° or less, the surface of the cured resin layer-2 is excellent in the removability of a fingerprint mark by wiping it off.

Preferably, the transparent conductive laminate of this invention is mainly used as a transparent electrode substrate for a touch panel, while it can be also used as a transparent electrode substrate for displays other than a touch panel, such as a flexible display, an electronic paper, etc.

The transparent conductive laminate of this invention preferably has the following layer structures.

(1) Polymer film/cured resin layer-1/transparent conductive layer (2) Polymer film/cured resin layer-1/metal oxide layer/transparent conductive layer (3) Polymer film/cured resin layer-1/optical interference layer/metal oxide layer/transparent conductive layer (4) Cured resin layer-2/polymer film/cured resin layer-1/transparent conductive layer (5) Cured resin layer-2/polymer film/cured resin layer-1/metal oxide layer/transparent conductive layer (6) Cured resin layer-2/polymer film/cured resin layer-1/optical interference layer/metal oxide layer/transparent conductive layer <Touch Panel>

The touch panel of this invention has the above transparent conductive laminate of this invention. The touch panel of this invention is composed of a movable electrode substrate and a fixed electrode substrate. The movable electrode substrate is preferably the transparent conductive laminate of this invention.

The fixed electrode substrate is preferably a substrate formed by stacking a glass substrate, a transparent conductive layer and a dot spacer in this order. The component for constituting the transparent conductive layer of the fixed electrode substrate includes, for example, silicon oxide, aluminum oxide, titanium oxide, magnesium oxide, zinc oxide, indium oxide, tin oxide, etc. Of these, indium oxide and/or tin oxide are/is particularly preferred. Further, the transparent conductive layer is preferably a crystalline layer composed mainly of indium oxide, and in particular, a layer formed of crystalline ITO (Indium Tin Oxide) is preferably used.

Further, the touch panel of this invention also preferably includes an embodiment in which a dot spacer is formed on the transparent conductive layer of the transparent conductive laminate of this invention.

According to this invention, there is provided a touch panel in which two transparent electrode substrates having a transparent conductive layer formed on at least one surface each are arranged to ensure that the transparent conductive layers face each other, and which uses the above transparent conductive laminate of this invention as at least one of the transparent electrode substrates.

EXAMPLES

This invention will be more specifically explained with reference to Examples hereinafter, while this invention shall not be limited by these Examples. In Examples, values were determined by the following methods.

<SP (Solubility Parameter)>

Calculated according to a Van Klevin' method described in "Properties of Polymers" (Elsevier, Amsterdam (1976)).

<Ra (Arithmetic Average Roughness)>

Measured with a stylus profilometer DEKTAK3 supplied by Sloan. The measurement was carried out according to JIS B0601-1994 Edition.

A base length is taken out of a roughness curve, X axis is set in the direction of average line of the portion that is taken out, Y axis is set in the direction of longitudinal magnification, and the roughness curve is expressed by y=f(x). $R_a$ (JIS B 0601-1994) refers to a value calculated from the following expression and expressed by micrometer (μm).

$$R_a = \frac{1}{L}\int_0^L |f(x)|dx$$

($L$: base length)

The roughness curve is prepared by removing a surface undulation component longer than a predetermined wavelength from a cross-sectional curve with a phase compensation type high-phase filter. The cross-sectional curve is a contour that appears in a cut surface when an object surface is cut with a plane perpendicular to the object surface. A cutoff value ($\lambda_c$) is a wavelength cutoff value corresponding to a frequency at which a gain of the phase compensation type high-phase filter becomes 50%. The base length (L) of the roughness curve is the length (base length) of a portion from which the length of the cutoff value is taken out of the roughness curve.

As a cutoff value ($\lambda_c$: mm) or an evaluation length ($L_n$: mm), one of the following values was selected.

| Cutoff value | Evaluation length |
| --- | --- |
| 0.25 mm | 1.25 mm |
| 0.8 mm | 4 mm |

<Rz (Ten-Point Average Roughness)>

Measured with a Surfcorder SE-3400 supplied by Kosaka Laboratories, Ltd. The measurement was carried out according to JIS B0601-1982.

Rz (JIS B 601-1982) refers to a value obtained by taking out a base length from a cross-sectional curve, calculating a difference between an average value of heights of top to fifth peaks measured in the direction of longitudinal magnification from a straight line that is in parallel with an average line and that does not cross the cross-sectional curve and an average value of heights of deepest to fifth valleys and expressing the difference by micrometer (μm).

Rz is determined from the following expression.

$$R_z = \frac{(R_1 + R_3 + R_5 + R_7 + R_9) - (R_2 + R_4 + R_6 + R_8 + R_{10})}{5}$$

($R_1$, $R_3$, $R_5$, $R_7$ and $R_9$ are heights of top to fifth peaks of the portion that is taken out and corresponds to the base length L. $R_2$, $R_4$, $R_6$, $R_8$ and $R_{10}$ are heights of deepest to fifth valleys of the portion that is taken out and corresponds to the base length L.)

The base length was set as 0.25 mm or 0.8 mm.

<Contact Angle>

A flat-sheet-shaped sample piece was horizontally placed with a cured resin layer surface facing upward, and one drop of water was fallen with a syringe having a volume of 1 ml according to a static drop method of JIS R3257 to statically place a water drop having a size of 1 μl or larger but 4 μl or smaller on the sample piece. Then, a water contact angle θ after it was statically placed for 1 minute was read out through a microscope with an angle-measuring device.

<Thickness>

Measured with a stylus thickness meter Alphastep supplied by KLA-Tencor Corporation.

<Haze>

Measured with a haze meter (MDH 2000) supplied by NIPPON DENSHOKU INDUSTRIES CO., LTD.

Haze (JIK K7136) is a percentage of transmitted light that passes through a test piece and that deviates at 0.044 rmd (2.5°) or more from incidence light due to forward scattering.

Haze (%) is calculated according to the following expression.

Haze=$[(\tau_4/\tau_2)-\tau_3(\tau_2/\tau_1)] \times 100$ ($\tau_1$: flux of incidence light,
$\tau_2$: total flux of light passed through a test piece,
$\tau_3$: Flux of light scattered with an apparatus, and
$\tau_4$: Flux of light scattered with an apparatus and a test piece.

<Total Light Transmittance>

Measured with a haze meter (MDH 2000) supplied by NIPPON DENSHOKU INDUSTRIES CO., LTD., according to JIS K7361-1.

<Antiglare Property>

A fluorescent lamp was reflected in a cured resin layer surface opposite to the transparent conductive layer surface of a produced transparent conductive laminate. The transparent conductive laminate was evaluated for an antiglare property depending upon how the end portions of the fluorescent lamp reflected in the cured resin layer surface were seen. A laminate free of the reflection was evaluated as good (O), and a laminate having the reflection was evaluated as defective (x).

<Anti-Newton Rings Property>

Under a three wave fluorescent lamp, a region where a movable electrode substrate and a fixed electrode substrate were brought into contact was visually observed for Newton rings obliquely in the direction of 60° relative to a touch panel surface (0° in the vertical direction). A touch panel in which no Newton rings were observable was evaluated as good (○), one in which Newton rings were slightly observable was evaluated as a little good (Δ), and one in which Newton rings were clearly observable was evaluated as defective (x).

<Flicker Property>

A touch panel was set on a liquid crystal display of about 123 dpi (diagonal 10.4 inches, XGA (1.024×768 dots)) and visually observed for flicker. A touch panel in which no flicker was observed was evaluated as good (○), one in which slight sparking was observed was evaluated as a little good (Δ), and one in which clear flicker was observed was evaluated as defective (x).

<Linearity>

A direct current of 5 V was applied between parallel electrodes on a movable electrode substrate or a fixed electrode substrate. A voltage was measured at intervals of 5 mm in the direction perpendicular to the parallel electrodes. Linearity L was determined on the basis of the following expression, $ET=(EB-EA)\cdot X/(B-A)+EA$ $L(\%)=(|ET-EX|)/(EB-EA)\cdot 100$ in which EA is a voltage in a measurement start position A, EB is a voltage in a measurement end position B, EX is an actual voltage value found in a distance X from A, ET is a theoretical value, and L is linearity.

<Sliding Durability>

A 0.8 R polyacetal pen was caused to slide on the center portion of a produced touch panel under a load of 450 g back and forth in a straight line 50 thousand times each up to a maximum of 300 thousand times. The touch panel was measured for linearity before and after the sliding durability test to determine a change amount. A touch panel that exhibited a linearity change amount of less than 1.5% of 300 thousand times was evaluated as good (OK), and a touch panel that exhibited a linearity change amount of 1.5% or more was evaluated as defective (NG) in electric property. Further, the number of sliding operations before the electric property came to be NG was measured.

<Edge-Writing Durability>

A polyacetal pen having a 0.8 R forward end was caused to slide on a position approximately 2.5 mm away from an insulating layer of a produced touch panel on a movable electrode side in parallel with the insulating layer under a load of 450 g back and forth in a straight line 10 thousand times each up to a maximum of 100 thousand times. The touch panel was measured for linearity before and after the sliding durability test to determine a change amount. A touch panel that exhibited a linearity change amount of less than 1.5% of 300 thousand times was evaluated as good (OK), and a touch panel that exhibited a linearity change amount of 1.5% or more was evaluated as defective (NG) in electric property. Further, the number of sliding operations before the electric property came to be NG was measured.

<Finger Writing Durability>

A produced touch panel was hit hard with a finger in one point of its center portion up to a maximum of 10 thousand times, and the touch panel was measured for an input force before and after the test of hitting with the finger, to determine a change in input force.

<Removability of Fingerprint Mark by Wiping it Off>

A measurement sample was placed on a black board with its cured resin layer surface facing upward, a fingerprint was pressed on the sample surface, it was wiped off with commercially available facial tissue, and then the sample surface was visually observed to determine to what degree the fingerprint mark remained. A sample in which no fingerprint mark was observed was evaluated as good (○), one in which it was slightly observed was evaluated as a little good (Δ), and one in which a clear fingerprint mark was observed was evaluated as defective (x).

<Light Resistance>

Light was applied to the movable electrode substrate side of a produced touch panel, and a light resistance test was carried out according to ASTM G154. A change in appearance after the light resistance test (whether or not a cured resin layer was peeled off) was observed. A touch panel in which no peeling was observed was evaluated as good (○), one in which the peeling was slightly observed was evaluated as a little good (Δ), and one in which the peeling was clearly observed was evaluated as defective (x).

Example 1

Transparent Conductive Laminate (Polymer Film)

A 188 μm thick polyethylene terephthalate (PET) film (OFW, supplied by Teijin DuPont Films Japan Limited) was used as a substrate.

(Cured Resin Layer (A))

The following coating solution A was coated on one surface of the substrate by a bar coating method, and an applied coating liquid was dried at 70° C. for 1 minutes, followed by irradiation with ultraviolet ray to cure it, to form a cured resin layer (A) having a thickness of 3.5 μm.

The coating liquid A was prepared by dissolving 4 parts by weight of an acryl copolymer containing an unsaturated double bond (SP value: 10.0, Tg: 92° C.), 100 parts by weight of pentaerythritol acrylate (SP value: 12.7) and 7 parts by weight of a photopolymerization initiator Irgacure 184 (supplied by Ciba Specialty Chemicals) in an isobutyl alcohol solvent in a manner that the resultant liquid had a solid content of 40% by weight.

In addition, the acryl copolymer containing an unsaturated double bond (SP value: 10.0, Tg: 92° C.) was prepared as follows.

A mixture containing 171.6 g of isobornyl methacrylate, 2.6 g of methyl methacrylate and 9.2 g of methyl acrylic acid was prepared. The mixture was dropwise added to 330.0 g of propylene glycol monomethyl ether heated to 110° C. under nitrogen atmosphere in a 1,000 ml reactor equipped with stirring blade, nitrogen introduction tube, cooling tube and dropping funnel, together with a solution of 1.8 g of tert-butyl peroxy-2-ethylhexanoate in 80 g of a propylene glycol monomethyl ether at a constant rate over 3 hours, and then the mixture was allowed to react at 110° C. for 30 minutes. Then, a solution of 0.2 g of tert-butyl peroxy-2-ethylhexanoate in 17.0 g of a propylene glycol monomethyl ether was dropwise added, a solution of 1.4 g of tetrabutylammonium bromide and 0.1 g of hydroquinone in 5.0 g of a propylene glycol monomethyl ether was added, a solution of 22.4 g of 4-hydroxybutyl acrylate glycidyl ether and 5.0 g of propylene glycol monomethyl ether was dropwise added over 2 hours with bubbling air, and then the mixture was allowed to react for 5 hours. There was obtained an unsaturated-double-bond-containing acrylic copolymer having a number average molecular weight of 5,500 and a weight average molecular weight of 18,000. The resin had an SP value of 10.0, a Tg of 92° C. and a surface tension of 31 dyn/cm.

(Cured Resin Layer (B))

The following coating liquid (B) was coated on the surface opposite to the surface having the cured resin layer (A) formed thereon by a bar coating method using the following coating liquid B and then it was dried at 70° C. for 1 minutes and irradiated with ultraviolet ray to cure it, whereby a cured resin layer (B) having a thickness of 3.5 μm was formed.

The coating liquid B was prepared by dissolving 4 parts by weight of the above unsaturated-double-bond-containing acryl copolymer (SP value: 10.0, Tg: 92° C.), 90 parts by weight of pentaerythritol triacrylate (SP value: 12.7), 10 parts by weight of trimethylolpropane triethylene glycol triacrylate (SP value: 11.6) and 7 parts by weight of a photopolymerization initiator Irgacure 184 (supplied by Ciba Specialty Chemicals) in a manner that the resultant liquid had a solid content of 40% by weight.

(Transparent Conductive Layer)

Then, a transparent conductive layer (ITO layer) was formed on the cured resin layer (A) by a sputtering method using an indium-tin oxide target having an indium oxide and tin oxide composition having a weight ratio of 95:5 and having a relative density of 98%. The formed transparent conductive layer had a thickness of 20 nm. Further, the transparent conductive layer (ITO layer) was crystallized by heat-treatment at 150° C. for 90 minutes to make a transparent conductive laminate, and it was used as a movable electrode substrate.

The crystallized ITO layer had a surface resistance of approximately 210Ω/□ (Ω/sq). When observed through TEM, the ITO layer had a crystal grain diameter in the range of 50 nm to 200 nm.

Touch Panel

Both surfaces of a 1.1 mm thick glass plate were dip-coated with $SiO_2$, and then an ITO layer having a thickness of 18 nm was formed thereon by a sputtering method. Then, a dot spacer having a height of 7 μm, a diameter of 70 μm and a pitch of 1.5 mm was formed on the ITO layer to make a fixed electrode substrate.

A touch panel having a layer structure shown in FIG. 1 was made from the fixed electrode substrate and the movable electrode substrate. Tables 1 and 2 show the properties of the thus-obtained transparent conductive laminate and touch panel. As is clear from Tables 1 and 2, the touch panel using the transparent conductive laminate of this Example was excellent in all of antiglare property, anti-Newton rings property, flicker property, sliding durability, edge-writing durability, finger writing durability, removability of a fingerprint mark by wiping it off and weatherability (light resistance).

Example 2

Transparent Conductive Laminate

A cured resin layer (A) and a cured resin layer (B) were formed on each surface of a 188 μm thick polyester terephthalate film (OFW, supplied by Teijin DuPont Films Japan Limited) in the same manner as in Example 1.
(Metal Oxide Layer)

Then, a metal oxide layer ($SiO_x$ layer) was formed on the cured resin layer (A) by a sputtering method using an Si target. The thus-formed $SiO_x$ layer had a thickness of 2.0 nm.
(Transparent Conductive Layer)

Then, a transparent conductive layer was formed on the metal oxide layer in the same manner as in Example 1 to make a transparent conductive laminate, and it was used as a movable electrode substrate. When observed through TEM, the ITO layer had a crystal grain diameter in the range of 50 nm to 200 nm.

Touch Panel

A fixed electrode substrate was made in the same manner as in Example 1. A touch panel having a layer structure shown in FIG. 2 was made from the thus-prepared fixed electrode substrate and movable electrode substrate.

Tables 1 and 2 show the properties of the thus-obtained transparent conductive laminate and touch panel. As is clear from Tables 1 and 2, the touch panel using the transparent conductive laminate of this Example was excellent in all of antiglare property, anti-Newton rings property, flicker property, sliding durability, edge-writing durability, finger writing durability, removability of a fingerprint mark by wiping it off and weatherability (light resistance).

Example 3

Transparent Conductive Laminate

A cured resin layer (A) and a cured resin layer (B) were formed on each surface of a 188 μm thick polyester terephthalate film (OFW, supplied by Teijin DuPont Films Japan Limited) in the same manner as in Example 1.
(High-Refractivity Layer)

Then, γ-glycidoxypropyltrimethoxysilane ("KBM403" supplied by the Shin-Etsu Chemical Co., Ltd.) and methyltrimethoxysilane ("KBM13" supplied by the Shin-Etsu Chemical Co., Ltd.) were mixed at a molar ratio of 1:1, and these alkoxysilanes were hydrolyzed with an acetic acid aqueous solution (pH=3.0) by a known method. To the thus-obtained alkoxysilane hydrolysis product was added N-β (aminoethyl)γ-aminopropylmethoxysilane ("KBM603" supplied by the Shin-Etsu Chemical Co., Ltd.) in a solid content weight ratio of 20:1, and further, the mixture was diluted with a solution mixture of isopropyl alcohol and n-butanol to prepare an alkoxysilane coating liquid C.

$TiO_2$ ultrafine particles having a primary particle diameter of 20 nm were mixed with the coating liquid C in a manner that the weight ratio of the $TiO_2$ ultrafine particles and alkoxysilane was 50:50, to prepare a coating liquid D. The coating liquid D was coated on the cured resin layer (A) by a bar coating method, and the applied coating liquid was calcined at 130° C. for 2 minutes to form a high-refractivity layer having a thickness of 55 nm.
(Low-Refractivity Layer)

The coating liquid C was coated on the high-refractivity layer by a bar coating method, and the applied coating liquid was calcined at 130° C. for 2 minutes to form a low-refractivity layer having a thickness of 65 nm, whereby an optical interference layer formed of the high-refractivity layer and the low-refractivity layer was made.
(Metal Oxide Layer)

Then, an $SiO_x$ layer was formed on the optical interference layer by a sputtering method using an Si target, and the thus-formed $SiO_x$ layer had a thickness of approximately 2.0 nm.
(Transparent Conductive Layer)

A transparent conductive layer was formed on the metal oxide layer in the same manner as in Example 1 to make a transparent conductive laminate, and it was used as a movable electrode substrate. When observed through TEM, the ITO layer had a crystal grain diameter in the range of 50 nm to 200 nm.

Touch Panel

A fixed electrode substrate was made in the same manner as in Example 1. A touch panel having a layer structure shown in FIG. 3 was made from the thus-obtained fixed electrode substrate and movable electrode substrate. Tables 1 and 2 show the properties of the thus-obtained transparent conductive laminate and touch panel. As is clear from Tables 1 and 2, the touch panel using the transparent conductive laminate of this Example was excellent in all of antiglare property, anti-Newton rings property, flicker property, sliding durability, edge-writing durability, finger writing durability, removability of fingerprint mark by wiping it off and weatherability (light resistance).

Example 4

Transparent Conductive Laminate

A coating liquid containing 100 parts by weight of pentaerythritol triacrylate, 7 parts by weight of a photopolymerization initiator Irgacure 184 (supplied by Ciba Specialty Chemicals) and a small amount of a surfactant for imparting leveling and lubricating properties was coated on one surface of a 188 μm thick polyester terephthalate film (OFW, supplied by Teijin DuPont Films Japan Limited) by a bar coating method, and an applied coating liquid was dried at 70° C. for 1 minute and then cured by irradiation with ultraviolet ray to form a cured resin layer (C) having a thickness of 4 μm.

A cured resin layer (A) was formed on the surface opposite to the surface having the cured resin layer (C) formed thereon from the coating liquid A used in Example 1 in the same manner as in Example 1.

Then, a transparent conductive layer was formed on the cured resin layer (A) in the same manner as in Example 1, and the thus-obtained transparent conductive laminate was used as a movable electrode substrate. When observed through TEM, an ITO layer had a crystal grain diameter in the range of 50 nm to 200 nm.

Touch Panel

A fixed electrode substrate was made in the same manner as in Example 1. A touch panel having a layer structure shown in FIG. 1 was made from the thus-obtained fixed electrode substrate and movable electrode substrate.

Tables 1 and 2 show the properties of the thus-obtained transparent conductive laminate and touch panel.

As is clear from Tables 1 and 2, the touch panel using the transparent conductive laminate of this Example was excellent in all of anti-Newton rings property, flicker property, sliding durability, edge-writing durability and finger writing durability. These are properties sufficient for use in fields that require none of the antiglare property, removability of a fingerprint mark by wiping it off and weatherability (light resistance).

Example 5

Transparent Conductive Laminate

A cured resin layer (A) was formed on each surface of a 188 μm thick polyester terephthalate film (OFW, supplied by Teijin DuPont Films Japan Limited) from the coating liquid A in Example 1 in the same manner as in Example 1.

Then, an amorphous transparent conductive layer (ITO layer) was formed on one of the cured resin layers (A) by a sputtering method using an indium oxide-tin oxide target having a composition containing indium oxide and tin oxide in a weight ratio of 95:5 and a filing density of 98%, to make a transparent conductive laminate, and it was used as a movable electrode substrate.

Touch Panel

A touch panel having a layer structure shown in FIG. 1 was made using the thus-obtained movable electrode substrate in the same manner as in Example 1. Tables 1 and 2 show the properties of the thus-obtained transparent conductive laminate and touch panel.

As is clear from Tables 1 and 2, the touch panel is inferior to that in Example 1 in sliding durability, edge-writing durability, finger writing durability and weatherability (light resistance). It is because the transparent conductive layer is amorphous that the touch panel is inferior in sliding durability, edge-writing durability and finger writing durability. Further, it is because the cured resin layer on the surface opposite to the surface having the transparent conductive layer formed thereon contains no trimethylolpropane triethylene glycol triacrylate that the touch panel is inferior to that in Example 1 in weatherability (light resistance).

Comparative Example 1

Transparent Conductive Laminate

A cured resin layer (A) was formed on one surface of a 188 μm thick polyester terephthalate film (OFW, supplied by Teijin DuPont Films Japan Limited) from the coating liquid A in Example 1 in the same manner as in Example 1. The following coating liquid (E) was coated on the surface opposite to the surface having the cured resin layer (A) formed thereon by a bar coating method, and the applied coating liquid was dried at 70° C. for 1 minute and then irradiated with ultraviolet ray to form a cured resin layer (E) having a thickness of 2.1 μm.

The coating liquid E was prepared by dissolving a mixture of 100 parts by weight of pentaerythritol triacrylate, 5 parts by weight of Irgacure 184 (supplied by Ciba Specialty Chemicals) and 0.7 part by weight of (HIPRESICA FQ, 3.0 μm product, grade N3N) supplied by Ube-Nitto Kasei Co., Ltd., in a 1:1 solvent mixture of isopropyl alcohol and 1-methoxy-2-propanol in a manner that the resultant coating liquid had a solid content of 25% by weight.

Then, a transparent conductive layer was formed on the cured resin layer (E) in the same manner as in Example 1 to form a transparent conductive laminate, and it was used as a movable electrode substrate. When observed through TEM, an ITO layer had a crystal grain diameter in the range of 50 nm to 200 nm.

Touch Panel

A touch panel having a layer structure shown in FIG. 1 was made using the thus-obtained transparent conductive laminate in the same manner as in Example 1. Tables 3 and 4 show the properties of the thus-obtained transparent conductive laminate and touch panel. As is clear from Tables 3 and 4, the transparent conductive laminate of this Comparative Example in which the cured resin layer contains fine particles as a component is defective with respect to flicker property, sliding durability, edge-writing durability, finger writing durability and weatherability (light resistance).

Comparative Example 2

Transparent Conductive Laminate

A cured resin layer (A) was formed on one surface of a 188 μm thick polyester terephthalate film (OFW, supplied by Teijin DuPont Films Japan Limited), and a cured resin layer (E) was formed on the other surface thereof, in the same manner as in Comparative Example 1. Then, an $SiO_x$ layer and an ITO layer were formed on the cured resin layer (E) in the same manner as in Example 2 to obtain a transparent conductive laminate.

Touch Panel

Figure 2:
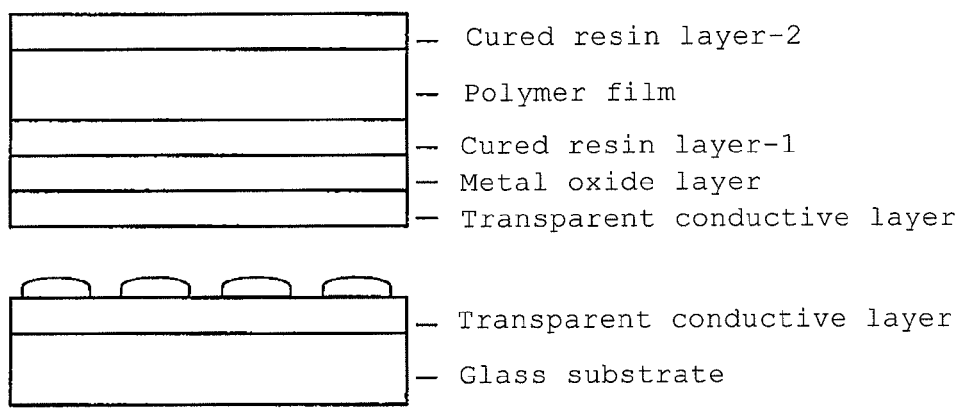
FIG. 2 shows another embodiment of layer structure of the transparent conductive laminate of this invention.

A touch panel having a layer structure shown in FIG. 2 was made using the thus-obtained transparent conductive laminate in the same manner as in Example 2. Tables 3 and 4 show the properties of the thus-obtained transparent conductive laminate and touch panel. As is clear from Tables 3 and 4, the transparent conductive laminate of this Comparative Example in which the cured resin layer contains fine particles as a component is defective with respect to flicker property, sliding durability, edge-writing durability, finger writing durability and weatherability (light resistance).

Comparative Example 3

Transparent Conductive Laminate

A cured resin layer (A) was formed on one surface of a 188 μm thick polyester terephthalate film (OFW, supplied by Teijin DuPont Films Japan Limited), and a cured resin layer (E) was formed on the other surface thereof, in the same manner as in Comparative Example 1. Then, an $SiO_x$ layer and an ITO layer were formed on the cured resin layer (E) in the same manner as in Example 3 to obtain a transparent conductive laminate.

Touch Panel

Figure 3:
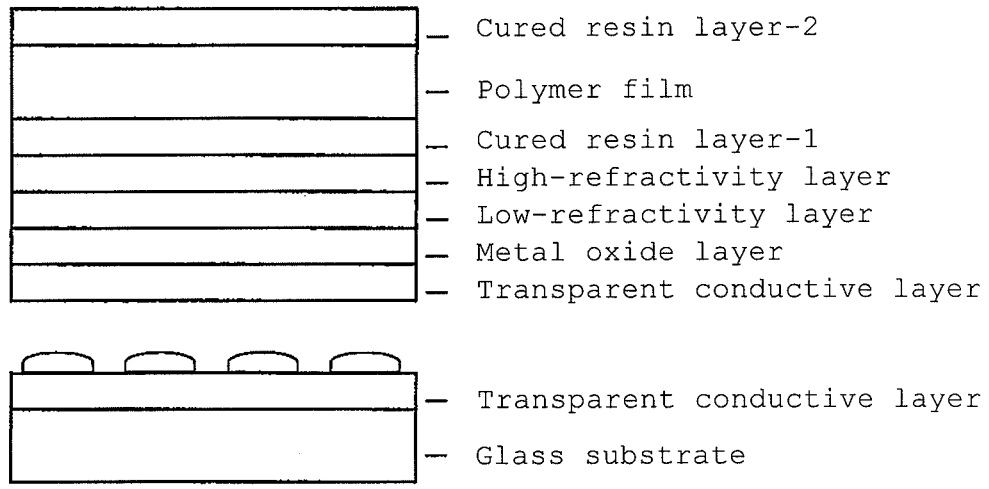
FIG. 3 shows still another embodiment of layer structure of the transparent conductive laminate of this invention.

A touch panel having a layer structure shown in FIG. 3 was made using the thus-obtained transparent conductive laminate in the same manner as in Example 3. Tables 3 and 4 show the properties of the thus-obtained transparent conductive laminate and touch panel. As is clear from Tables 3 and 4, the transparent conductive laminate of this Comparative Example in which the cured resin layer contains fine particles as a component is defective with respect to flicker property, sliding durability, edge-writing durability, finger writing durability and weatherability (light resistance).

Comparative Example 4

Transparent Conductive Laminate

A cured resin layer (A) was formed on one surface of a 188 μm thick polyester terephthalate film (OFW, supplied by Teijin DuPont Films Japan Limited), and a cured resin layer (E) was formed on the other surface thereof, in the same manner as in Comparative Example 1. Then, an amorphous ITO layer was formed on the cured resin layer (E) in the same manner as in Example 5 to obtain a transparent conductive laminate.

Touch Panel

A touch panel having a layer structure shown in FIG. 1 was made using the thus-obtained transparent conductive laminate in the same manner as in Example 5. Tables 3 and 4 show the properties of the thus-obtained transparent conductive laminate and touch panel. As is clear from Tables 3 and 4, the transparent conductive laminate of this Comparative Example, in which the cured resin layer contains fine particles as a component and the transparent conductive layer is amorphous, is inferior to that of Example 5 with respect to flicker property, sliding durability, edge-writing durability and finger writing durability.

Comparative Example 5

Transparent Conductive Laminate

The following coating liquid F was coated on one surface of a 188 μm thick polyester terephthalate film (OFW, supplied by Teijin DuPont Films Japan Limited) by a bar coating method, and the applied coating liquid was dried at 70° C. for 1 minute and then cured by irradiation with ultraviolet ray to form a cured resin layer (F) having a thickness of 4.0 μm.

The coating liquid F was prepared by dissolving 100 parts by weight of pentaerythritol acrylate, 7 parts by weight of a photopolymerization initiator Irgacure 184 (supplied by Ciba Specialty Chemicals and 10 parts by weight of silica fine particles having an average primary particle diameter of 4.5 μm (TOSPERL 145, supplied by Toshiba-Silicone Co., Ltd.) in a 1:1 solution mixture of isopropyl alcohol and 1-methoxy-2-propanol in a manner that the resultant coating liquid had a solid content of 40% by weight, and adding a small amount of a surfactant for imparting leveling and lubricating properties.

The same cured resin layer (E) as that used in Comparative Example 1 was formed on the surface opposite to the surface having the cured resin layer (F) formed thereon. Then, an ITO layer was formed on the cured resin layer (E) in the same manner as in Example 1 to obtain a transparent conductive laminate.

Touch Panel

A touch panel having a layer structure shown in FIG. 1 was made using the thus-obtained transparent conductive laminate in the same manner as in Example 1. Tables 3 and 4 show the properties of the thus-obtained transparent conductive laminate and touch panel. As is clear from Tables 3 and 4, the transparent conductive laminate is defective with respect to flicker property, removability of a fingerprint mark by wiping it off, sliding durability, edge-writing durability, finger writing durability and weatherability (light resistance).

TABLE 1

| | | Example 1 | Example 2 | Example 3 | Example 4 | Example 5 |
|---|---|---|---|---|---|---|
| Cured resin layer | Kind | (B) | (B) | (B) | (C) | (A) |
| | Thickness (μm) | 3.5 | 3.5 | 3.5 | 4 | 3.5 |
| | Water contact angle (degree) | 77 | 77 | 77 | 112 | 77 |
| | Surface roughness Ra (nm) | 125 | 125 | 125 | 35 | 130 |
| | Surface roughness Rz (nm) | 0.75 | 0.75 | 0.75 | 0.15 | 0.75 |
| Polymer film | Kind | PET | PET | PET | PET | PET |
| Cured resin layer | Kind | (A) | (A) | (A) | (A) | (A) |
| | Thickness (μm) | 3.5 | 3.5 | 3.5 | 3.5 | 3.5 |
| | Surface roughness Ra (nm) | 130 | 130 | 100 | 130 | 130 |
| | Surface roughness Rz (μm) | 0.75 | 0.75 | 0.65 | 0.75 | 0.75 |
| Transparent conductive layer, etc. | | ITO (Cr) Th: 20 nm | $SiO_x$ Th: 2.0 nm ITO (Cr) Th: 20 nm | High-refr. layer Low-refr. layer $SiO_x$ Th: 2.0 nm ITO (Cr) Th: 20 nm | ITO (Cr) Th: 20 nm | ITO (Am) Th: 20 nm |
| Transparent conductive laminate | Haze (%) | 9.8 | 9.7 | 8.5 | 5.5 | 10.1 |
| | Total light transmittance (%) | 87 | 87 | 89 | 88 | 85 |
| | Antiglare property | ◯ | ◯ | ◯ | X | ◯ |

ITO (Cr) = ITO (crystalline), ITO (Am) = ITO (amorphous), High-refr. = High-refractivity, Low-refr. = Low-refractivity, Th = Thickness

TABLE 2

|  |  | Example 1 | Example 2 | Example 3 | Example 4 | Example 5 |
|---|---|---|---|---|---|---|
| Touch panel | Anti-Newton rings property | ○ | ○ | ○ | ○ | ○ |
|  | Flicker property | ○ | ○ | ○ | ○ | ○ |
|  | Sliding durability (Amount of change in linearity) | 300 thousand times OK (+1.13) | 300 thousand times OK (+0.57) | 300 thousand times OK (+0.63) | 300 thousand times OK (+0.65) | 100 thousand times NG (+1.56) |
|  | Edge-writing durability (Amount of change in linearity) | 100 thousand times OK (+0.98) | 100 thousand times OK (+0.38) | 100 thousand times OK (+0.41) | 100 thousand times OK (+0.50) | 40 thousand times NG (+1.87) |
|  | Finger writing durability (Change in inputted load) | After 10 thousand times No change | After 10 thousand times, No change | After 10 thousand times No change | After 10 thousand times No change | After 6 thousand times Increase, NG |
|  | Removability of fingerprint mark by wiping it off | ○ | ○ | ○ | X | ○ |
|  | Light resistance (ASTM G154) | ○ | ○ | ○ | X | X |

TABLE 3

|  |  | CEx. 1 | CEx. 2 | CEx. 3 | CEx. 4 | CEx. 5 |
|---|---|---|---|---|---|---|
| Cured resin layer | Kind | (A) | (A) | (A) | (A) | (F) |
|  | Thickness (μm) | 3.5 | 3.5 | 3.5 | 3.5 | 3.0 |
|  | Water contact angle (degree) | 77 | 77 | 77 | 77 | 118 |
|  | Surface roughness Ra (nm) | 130 | 130 | 130 | 130 | 150 |
|  | Surface roughness Rz (μm) | 0.75 | 0.75 | 0.75 | 0.75 | 0.90 |
| Polymer film | Kind | PET | PET | PET | PET | PET |
| Cured resin layer | Kind | (E) | (E) | (E) | (E) | (E) |
|  | Thickness (μm) | 2.1 | 2.1 | 2.1 | 2.1 | 2.1 |
|  | Surface roughness Ra (nm) | 220 | 220 | 200 | 220 | 210 |
|  | Surface roughness Rz (μm) | 1.3 | 1.3 | 1.3 | 1.3 | 1.3 |
| Transparent conductive layer, etc. |  | ITO (Cr) Th: 20 nm | $SiO_x$ Th: 2.0 nm ITO (Cr) Th: 20 nm | High-refr. layer Low-refr. layer $SiO_x$ Th: 2.0 nm ITO (Cr) Th: 20 nm | ITO (Am) Th: 20 nm | ITO (Cr) Th: 20 nm |
| Transparent conductive laminate | Haze (%) | 7.3 | 7.5 | 6.5 | 7.5 | 9.3 |
|  | Total light transmittance (%) | 87 | 87 | 89 | 85 | 87 |
|  | Antiglare property | ○ | ○ | ○ | ○ | ○ |

CEx. = Comparative Example, ITO (Cr) = ITO (crystalline), ITO (Am) = ITO (amorphous), High-refr. = High-refractivity, Low-refr. = Low-refractivity, Th = Thickness

TABLE 4

|  |  | CEx. 1 | CEx. 2 | CEx. 3 | CEx. 4 | CEx. 5 |
|---|---|---|---|---|---|---|
| Touch panel | Anti-Newton rings property | ○ | ○ | ○ | ○ | ○ |
|  | Flicker property | X | X | X | X | X |

TABLE 4-continued

|  | CEx. 1 | CEx. 2 | CEx. 3 | CEx. 4 | CEx. 5 |
|---|---|---|---|---|---|
| Sliding durability (Amount of change in linearity) | 100 thousand times, NG (+1.74) | 200 thousand times, NG (+2.12) | 200 thousand times, NG (+1.98) | 50 thousand times, NG (+2.52) | 100 thousand times, NG (+1.80) |
| Edge-writing durability (Amount of change in linearity) | 10 thousand times, NG (+3.05) | 20 thousand times, NG (+4.15) | 20 thousand times, NG (+3.99) | 30 thousand times, NG (+2.11) | 10 thousand times, NG (+4.82) |
| Finger writing durability (Change in inputted load) | After 3,000 times Increase, NG | After 3,000 times Increase, NG | After 3,000 times Increase, NG | After 3,000 times Increase, NG | After 3,000 times Increase, NG |
| Removability of fingerprint mark by wiping if off | ◯ | ◯ | ◯ | ◯ | X |
| Light resistance (ASTM G154) | X | X | X | X | X |

CEx. = Comparative Example

Example 6

Transparent Conductive Laminate

A dot spacer was formed on the same transparent conductive laminate as that produced in Example 1 to make a fixed electrode substrate, in the same manner as in Example 1. As a movable electrode substrate, V270L-TFMP supplied by NITTO DENKO CORPORATION was used.

Touch Panel

Figure 4:
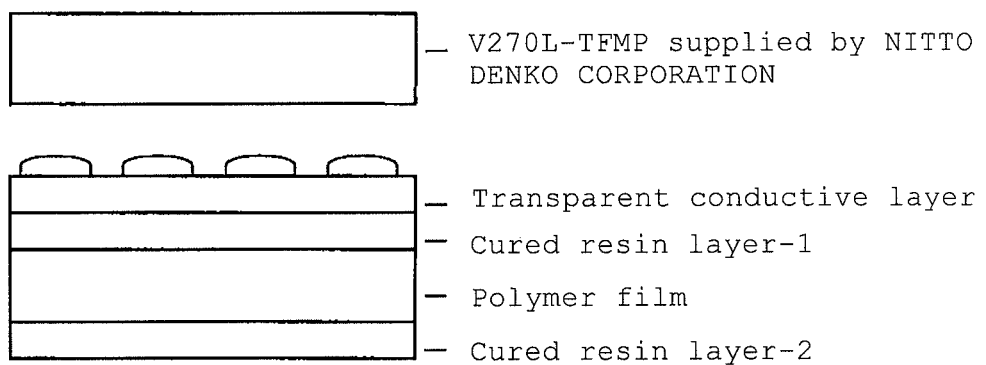
FIG. 4 shows yet another embodiment of layer structure of the transparent conductive laminate of this invention.

A touch panel having a layer structure shown in FIG. 4 was made from the movable electrode substrate and the fixed electrode substrate. The movable electrode substrate and the fixed electrode substrate of the thus-obtained touch panel were held between the thumb and finger and rubbed strongly against each other. Before and after they were rubbed against each other, the movable electrode substrate was measured for linearity. There was observed no change in linearity from that found before they were rubbed. The conductive layer surface of the transparent conductive laminate was observed through a microscope. No damage was observed in the rubbed region.

Example 7

Transparent Conductive Laminate

A transparent conductive laminate was made in the same manner as in Example 1 except that a 100 µm thick polycarbonate film (PUREACE, supplied by TEIJIN CHEMICALS, LTD.) was used in place. A fixed electrode substrate was made from the thus-obtained transparent conductive laminate in the same manner as in Example 6. As a movable electrode substrate, V270L-TFMP supplied by NITTO DENKO CORPORATION was used.

Touch Panel

A touch panel having a layer structure shown in FIG. 4 was made from the movable electrode substrate and the fixed electrode substrate in the same manner as in Example 6. The movable electrode substrate and the fixed electrode substrate of the thus-obtained touch panel were held between the thumb and finger and rubbed strongly against each other. Before and after they were rubbed against each other, the movable electrode substrate was measured for linearity. There was observed no change in linearity from that found before they were rubbed.

The conductive layer surface of the transparent conductive laminate was observed through a microscope. No damage was observed in the rubbed region.

Comparative Example 6

Transparent Conductive Laminate

A fixed electrode substrate was made from the same transparent conductive laminate as that obtained in Comparative Example 1 in the same manner as in Example 6. As a movable electrode substrate, V270L-TFMP supplied by NITTO DENKO CORPORATION was used.

Touch Panel

Then, a touch panel having a layer structure shown in FIG. 4 was made from the movable electrode substrate and the fixed electrode substrate in the same manner as in Example 6.

The movable electrode substrate and the fixed electrode substrate of the thus-obtained touch panel were held between the thumb and finger and rubbed strongly against each other. Before and after they were rubbed against each other, the movable electrode substrate was measured for linearity. It was found that the linearity increased after they were rubbed. It was also found that the inter-terminal resistance value of the movable electrode substrate increased.

The conductive layer surface of the movable electrode substrate was observed through a microscope. A number of scratches caused by fine particles contained in the fixed electrode substrate were found in a rubbed region. It was judged that the linearity and inter-terminal resistance value of the movable electrode substrate increased due to the scratches found.

EFFECT OF THE INVENTION

The transparent conductive laminate of this invention does not contain any fine particles for imparting with concavoconvex shapes in its cured resin layer and has concavoconvex shapes on the surface of the cured resin layer-1. Since the transparent conductive laminate of this invention contains no fine particles, it causes less flicker. The transparent conductive laminate of this invention is excellent in sliding durability, edge-writing durability and finger writing durability, and hence can be used as a movable electrode substrate for a touch panel. The transparent conductive laminate of this invention causes fewer scratches on the substrate surface which it faces, and it can be used as a fixed electrode substrate for a touch panel.

The touch panel of this invention causes less flicker and causes less Newton rings. Further, the touch panel of this invention is excellent in sliding durability, edge-writing durability and finger writing durability.

The touch panel of this invention causes fewer scratches on its movable electrode substrate. Further, the touch panel of this invention having the cured resin layer-2 is excellent in light resistance.

INDUSTRIAL UTILITY

The transparent conductive laminate of this invention can be used as a movable electrode substrate or fixed electrode substrate of a touch panel.

The invention claimed is:

1. A transparent conductive laminate that is a laminate formed by laminating a polymer film, a cured resin layer-1 and a transparent conductive layer in this order, the cured resin layer-1 having concavoconvex shapes formed by phase separation of two components and containing no particles that impart concavoconvex shapes, and the cured resin layer-1 having an arithmetic average roughness (Ra), measured according to JIS B0601-1994, of 0.05 μm or more but less than 0.5 μm and a ten-point average roughness (Rz), measured according to JIS B0601-1982, of 0.5 μm or more but less than 2.0 μm,
wherein the transparent conductive laminate has a metal oxide layer having a thickness of 0.5 nm or more but less than 5 nm between the cured resin layer-1 and the transparent conductive layer.

2. The transparent conductive laminate of claim 1, wherein, of the two components forming the cured resin layer-1, a first component is an acryl copolymer containing an unsaturated double bond and a second component is a polyfunctional unsaturated double bond containing monomer.

3. The transparent conductive laminate of claim 2, wherein the first component has an SP value (SP1) and the second component has an SP value (SP2), the SP values satisfying SP1<SP2.

4. The transparent conductive laminate of claim 1, which has a cured resin layer-2 on the surface of the polymer film opposite to the surface where the transparent conductive layer is formed, the cured resin layer-2 having concavoconvex shapes formed by phase separation of two components and containing no particles that impart concavoconvex shapes, and the cured resin layer-2 having an arithmetic average roughness (Ra), measured according to JIS B0601-1994, of 0.05 μm or more but less than 0.5 μm and a ten-point average roughness (Rz), measured according to JIS B0601-1982, of 0.5 μm or more but less than 2 μm.

5. The transparent conductive laminate of claim 4, wherein, of the two components forming the cured resin layer-2, a first component is an unsaturated double bond acryl copolymer and a second component is a polyfunctional unsaturated double bond containing monomer.

6. The transparent conductive laminate of claim 5, wherein the first component has an SP value (SP1) and the second component has an SP value (SP2), the SP values satisfying SP1<SP2.

7. The transparent conductive laminate of claim 5, wherein the second component in the cured resin layer-2 is a trifunctional or higher polyfunctional unsaturated-double-bond-containing monomer having 3 to 6 mole equivalent amount of an alkylene oxide unit having 2 to 4 carbon atoms in its molecule.

8. The transparent conductive laminate of claim 7, wherein the cured resin layer-2 contains 2 to 40% by weight of the polyfunctional unsaturated-double-bond-containing monomer.

9. The transparent conductive laminate of claim 1, which has a haze, defined in JIS K 7136, of 2% or more but less than 20%.

10. The transparent conductive laminate of claim 1, wherein the transparent conductive layer has a thickness of 5 nm or more but 50 nm or less and is crystalline.

11. The transparent conductive laminate of claim 1, which has a cured resin layer-3 having a refractive index of 1.2 to 1.55 and a thickness of 0.05 μm or more but 0.5 μm or less between the cured resin layer-1 and the transparent conductive layer.

12. The transparent conductive laminate of claim 1, which has a cured resin layer-3 having a refractive index of 1.2 to 1.55 and a thickness of 0.05 μm or more but 0.5 μm or less between the cured resin layer-1 and the metal oxide layer.

13. The transparent conductive laminate of claim 1, which has an optical interference layer formed of a low-refractivity layer and a high-refractivity layer between the cured resin layer-1 and the transparent conductive layer, the low-refractivity layer being in contact with the transparent conductive layer.

14. The transparent conductive laminate of claim 1, which has an optical interference layer formed of a low-refractivity layer and a high-refractivity layer between the cured resin layer-1 and the metal oxide layer, the low-refractivity layer being in contact with the metal oxide layer.

15. A touch panel having the transparent conductive laminate recited in claim 1.

16. A touch panel having two transparent electrode substrates that have a transparent conductive layer on at least one surface each and that are arranged in a manner that the transparent conductive layers thereof face each other, wherein the transparent conductive laminate recited in claim 1 is used as at least one of the transparent electrode substrates.

* * * * *